(12) United States Patent
Chung et al.

(10) Patent No.: US 10,150,245 B2
(45) Date of Patent: Dec. 11, 2018

(54) METHOD OF PATTERNING A SURFACE AND ARTICLES COMPRISING THE SAME

(75) Inventors: Kenneth K. Chung, Gainesville, FL (US); Anthony B. Brennan, Gainesville, FL (US); Joseph W. Bagan, Greenwood Village, CO (US); Mark M. Spiecker, Denver, CO (US)

(73) Assignee: University of Florida Research Foundation, Inc., Gainesville, FL (US)

(*) Notice: Subject to any disclaimer, the term of this patent is extended or adjusted under 35 U.S.C. 154(b) by 1022 days.

(21) Appl. No.: 12/616,915

(22) Filed: Nov. 12, 2009

(65) Prior Publication Data

US 2010/0119755 A1 May 13, 2010

Related U.S. Application Data

(60) Provisional application No. 61/113,278, filed on Nov. 11, 2008, provisional application No. 61/153,135, filed on Feb. 17, 2009.

(51) Int. Cl.
*B32B 1/02* (2006.01)
*B29C 59/02* (2006.01)
*B32B 1/08* (2006.01)

(52) U.S. Cl.
CPC ....... *B29C 59/021* (2013.01); *Y10T 428/1393* (2015.01); *Y10T 428/24802* (2015.01)

(58) Field of Classification Search
CPC ........... B32B 1/02; B32B 1/08; B29C 59/021; Y10T 428/1393; Y10T 428/28402
USPC ........ 428/34.1, 34.2, 35.7, 35.9, 36.9, 36.91
See application file for complete search history.

(56) References Cited

U.S. PATENT DOCUMENTS

| | | | |
|---|---|---|---|
| 3,243,850 | A | 4/1966 | Zieg |
| 3,351,441 | A | 11/1967 | Gewiss et al. |
| 3,354,022 | A | 11/1967 | Dettre et al. |
| 3,795,471 | A | 3/1974 | Milani |
| 3,935,485 | A | 1/1976 | Yoshida et al. |
| 3,971,084 | A | 7/1976 | Spier |
| 3,992,162 | A | 11/1976 | Gewiss |
| 3,996,323 | A | 12/1976 | Hegler et al. |

(Continued)

FOREIGN PATENT DOCUMENTS

| | | |
|---|---|---|
| CA | 2368204 | 10/2000 |
| DE | 3801139 C1 | 1/1988 |

(Continued)

OTHER PUBLICATIONS

Lillard, Los Alamos National Tests Labs Tests the HD Rosetta Disc, Report Publication LA-UR-0041, Los Alamos National Laboratory, Jan. 31, 1999.*

(Continued)

*Primary Examiner* — Marc A Patterson
(74) *Attorney, Agent, or Firm* — Alston & Bird LLP

(57) ABSTRACT

An article has a curved surface. Disposed upon the curved surface is a plurality of patterns. Each pattern is defined by a plurality of spaced apart features attached to or projected into the curved surface. The plurality of features each have at least one neighboring feature having a substantially different geometry, wherein an average spacing between adjacent features is about 1 nanometer and about 1 millimeter in at least a portion of the curved surface. The plurality of spaced apart features are represented by a periodic function.

29 Claims, 7 Drawing Sheets

(56) References Cited

U.S. PATENT DOCUMENTS

| | | | |
|---|---|---|---|
| 4,101,625 A | 7/1978 | Haley | |
| 4,283,461 A | 8/1981 | Wooden et al. | |
| 4,284,689 A | 8/1981 | Craighead et al. | |
| 4,297,394 A | 10/1981 | Wooden et al. | |
| 4,640,859 A | 2/1987 | Hansen et al. | |
| 4,865,603 A | 9/1989 | Noiles | |
| 5,008,140 A | 4/1991 | Schmertz | |
| 5,028,474 A | 7/1991 | Czaplicki | |
| 5,328,200 A | 7/1994 | Pelizzari | |
| 5,344,691 A | 9/1994 | Hanschen et al. | |
| 5,403,680 A * | 4/1995 | Otagawa et al. | 429/213 |
| 5,645,764 A | 7/1997 | Angelopoulos et al. | |
| 5,650,214 A | 7/1997 | Anderson et al. | |
| 5,842,937 A | 12/1998 | Dalton et al. | |
| 5,971,326 A | 10/1999 | Bechert | |
| 5,976,284 A | 11/1999 | Calvert et al. | |
| 6,010,442 A | 1/2000 | Lemons et al. | |
| 6,075,585 A | 6/2000 | Minne et al. | |
| D430,734 S | 9/2000 | Bredendick et al. | |
| D436,738 S | 1/2001 | Bredendick et al. | |
| D440,051 S | 4/2001 | Bredendick et al. | |
| 6,231,463 B1 | 5/2001 | Tavares et al. | |
| D443,766 S | 6/2001 | Bredendick et al. | |
| 6,394,652 B2 | 5/2002 | Meyer et al. | |
| D459,897 S | 7/2002 | Bredendick et al. | |
| 6,458,447 B1 | 10/2002 | Cabell et al. | |
| 6,569,038 B2 | 5/2003 | Sullivan | |
| 6,616,882 B1 | 9/2003 | Lidgett | |
| 6,660,363 B1 | 12/2003 | Barthlott | |
| 6,686,026 B2 | 2/2004 | Spiewak et al. | |
| 6,911,243 B2 | 6/2005 | Sher et al. | |
| 6,946,170 B2 | 9/2005 | Gerber et al. | |
| D518,648 S | 4/2006 | Broering et al. | |
| 7,117,536 B2 | 10/2006 | Burnett et al. | |
| 7,117,807 B2 | 10/2006 | Bohn, Jr. et al. | |
| 7,143,709 B2 | 12/2006 | Brennan et al. | |
| 7,303,491 B2 | 12/2007 | Nardacci et al. | |
| 7,650,848 B2 | 1/2010 | Brennan et al. | |
| 7,691,464 B2 | 4/2010 | Gerber et al. | |
| 2002/0150724 A1 | 10/2002 | Nun et al. | |
| 2003/0228445 A1* | 12/2003 | Vaughn et al. | 428/156 |
| 2004/0086674 A1 | 5/2004 | Holman | |
| 2004/0191538 A1* | 9/2004 | Huang | 428/447 |
| 2005/0003146 A1 | 1/2005 | Spath | |
| 2005/0008828 A1* | 1/2005 | Libera et al. | 428/195.1 |
| 2005/0119723 A1 | 6/2005 | Peacock, III | |
| 2005/0119758 A1 | 6/2005 | Alexander et al. | |
| 2005/0136217 A1 | 6/2005 | Barthlott et al. | |
| 2005/0178286 A1 | 8/2005 | Bohn, Jr. et al. | |
| 2006/0219143 A1* | 10/2006 | Brennan et al. | 114/67 R |
| 2007/0098797 A1 | 5/2007 | Barthlott et al. | |
| 2007/0227428 A1 | 10/2007 | Brennan | |
| 2008/0202370 A1 | 8/2008 | Muraoka | |
| 2010/0033818 A1 | 2/2010 | Petcavich | |
| 2010/0119755 A1 | 5/2010 | Chung | |
| 2010/0226943 A1 | 9/2010 | Brennan | |

FOREIGN PATENT DOCUMENTS

| | | |
|---|---|---|
| DE | 19613304 A1 | 10/1997 |
| DE | 19840303 A1 | 3/2000 |
| DE | 198 48 943 A1 | 4/2000 |
| EP | 0015312 A1 | 9/1980 |
| EP | 1469198 A1 | 10/2004 |
| GB | 722591 | 1/1955 |
| GB | 1063870 A * | 3/1967 |
| JP | 62-046232 | 2/1987 |
| JP | 05010309 A | 1/1993 |
| JP | 10-123693 | 5/1998 |
| JP | 2001207123 | 7/2001 |
| WO | WO932517 | 12/1993 |
| WO | WO9604123 | 2/1996 |
| WO | WO0058410 | 10/2000 |
| WO | WO 02/14078 A2 | 2/2002 |
| WO | 2006026993 A1 | 3/2006 |
| WO | 2008070625 A2 | 6/2008 |

OTHER PUBLICATIONS

European Search Report for Appl. 12172148.4 dated Nov. 23, 2012, 13 pages.
Fractals Are SMART: Fractal Pack 1 Educators' Guide. Downloaded from the FractalFoundation.org. Copyright 2009.
Search Report dated Jun. 25, 2010 for Application No. PCT/US09/064160—8 pages.
Written Opinion dated Jun. 13, 2006 for Application No. PCT/US05/04972—6 pages.
Written Opinion dated May 22, 2008 for Application No. PCT/US07/86289—6 pages.
Callow et al. "Primary adhesion of enteromorphia (chlorophyta, ulvales) propagules: quantitative settlement studies and video microscopy", J. Phycol., 1997, vol. 33 pp. 938-947.
Cassie et al. "Wettability of porous surfaces", Trans. Faraday Society, 1944, vol. 40, pp. 546-551.
Horiuchi et al. "Optical lithography onto inside surfaces of small-diameter pipes" Microelectronic Engineering 85 (2008) 1043-1046—Elsevier.
Quere "Rough ideas on wetting", Physica A, 2002 vol. 313, pp. 32-46.
International Search Report dated May 22, 2008 for Application No. PCT/US07/86289—10 pages.
International Search Report dated Jun. 13, 2006 for Application No. PCT/US05/04972—4 pages.
Wenzel "Resistance of solid surfaces to wetting by water", Industrial and Engineering Chemistry, 1936, vol. 28, No. 8, pp. 988-994.
Xia et al. "Soft Lithography", Annu. Rev. Mater. Sci., 1998, vol. 28, pp. 153-184.
Written Opinion of the International Search Report dated Jun. 25, 2010.
A. Tuteja, et al. "Designing Superoleophobic Surfaces" Science (Dec. 7, 2007) pp. 1618-1622, ScienceMag.org.
B. He, et al. "Multiple Equilibrium Droplet Shapes and Design Criterion for Rough Hydrophobic Surfaces", Langmuir (2003) pp. 4999-5003, vol. 19; American Chemical Society.
D. Quere "Wetting and Roughness" Annu. Rev. Mater. Res. (2008) pp. 71-99 vol. 38, Annual Reviews.
D.M. Spori, et al. "Beyond the Lotus Effect: Roughness Influences on Wetting Over a Wide Surface-Energy Range" Langmuir (2008) pp. 5411-5417, vol. 24, American Chemical Society.
D.W. Bechert, et al. "Fluid Mechanics of Biological Surfaces and their Technological Application", Naturwissenschaften (2000) pp. 157-171; vol. 87; Springer-Verlag, Germany.
E. Martines, et al. "Superhydrophobicity and Superhydrophilicity of Regular Nanopatterns" Nano Letters (2005) pp. 2097-2103, vol. 5, No. 10, American Chemical Society.
G.McHale, et al. "Analysis of Droplet Evaporation on a Superhydrophobic Surface" Langmuir (2005) pp. 11053-11060, vol. 21, American Chemical Society.
H.C. Flemming, "Biofouling in Water Systems—Cases, Causes and Countermeasures", Appl. Microbiol Biotechnol (2002), pp. 629-640, vol. 59; Springer-Verlag, Germany.
J. Bico, et al. "Wetting of Textured Surfaces", Colliods and Surfaces (2002) pp. 41-46, vol. 206; Elsevier Science B.V.
J. Bico, et al. "Pearl Drops" Europhysics Letters (Jul. 15, 1999) pp. 220-226; vol. 47 (2); EDP Sciences.
J. Genzer, et al. "Recent Developments in Superhydrophobic Surfaces and their Relevance to Marine Fouling: A Review" Biofouling (2006) pp. 1-22, Taylor & Francis.
J.M. Hills, et al. "Settlement of Barnacle Larvae is Governed by Euclidean and not Fractal Surface Characteristics" Functional Ecology (1999), pp. 868-875, vol. 13, British Ecological Society.
L.D. Chambers, et al. "Modern Approaches to Marine Antifouling Coatings" Surface and Coatings Technology (2006) pp. 3642-3652, vol. 201, Elsevier B.V.

(56) References Cited

OTHER PUBLICATIONS

M.E. Abdelsalam, et al. "Wetting of Regularly Structured Gold Surfaces" Langmuir (2005) pp. 1753-1757, vol. 21, American Chemical Society.
M.E. Callow, et al. "Microtopographic Cues for Settlement of Zoospores of the Green Fouling Alga Enteromorpha", Biofouling (2002) pp. 237-245; vol. 18 (3); Taylor & Francis, UK.
R. Furstner, et al. "Wetting and Self-Cleaning Properties of Artificial Superhydrophobic Surfaces", Langmuir (2005), pp. 956-961, vol. 21; American Chemical Society.
W.R. Hansen, et al. "Evidence for Self-Cleaning in Gecko Setae" Evolution (Jan. 11, 2005) pp. 385-389, vol. 102 vol. 2; PNAS.
Y. Chen, et al. "Anisotropy in the Wetting of Rough Surfaces", Journal of Colloid and Interface Sciences (2005), pp. 458-464, vol. 281; Elsevier Inc.
Z. Burton, et al. "Hydrophobicity, Adhesion, and Friction Properties of Nanopatterned Polymers and Scale Dependence for Micro- and Nanoelectromechanical Systems" Nano Letters (2005) pp. 1607-1613, vol. 5 No. 8, American Chemical Society.
Extended European Search Report from corresponding European Patent Application No. 09826724.8 dated Nov. 28, 2017, 9 pages.

\* cited by examiner

METHOD OF PATTERNING A SURFACE AND ARTICLES COMPRISING THE SAME

CROSS-REFERENCE TO RELATED APPLICATIONS

This application claims priority to provisional application No. 61/113,278 filed on Nov. 11, 2008 and to provisional application No. 61/153,135 filed on Feb. 17, 2009, the entire contents of which are hereby incorporated by reference.

BACKGROUND

This disclosure relates to a method of patterning a surface and to articles comprising the same.

Surfaces that have patterns and other forms of texturing (hereinafter "texturing") can be advantageously used to minimize the adhesion of living organisms and other forms of non-living matter (e.g., ice, dust, dirt, and the like) to the surface. The texturing can have dimensions that are selected to specifically prevent the adhesion of specific living organisms or non-living matter on the surface, while at the same time encouraging the growth of other organisms or the adhesion of other types of non-living matter to the surface.

For example, in order to prevent the growth of certain types of living organisms the dimensions of the texturing may have to be in the nanometer or in the micrometer range, while for preventing the growth of certain other types of organisms, the dimensions of the texturing may have to be in the millimeter or centimeter range. In another example, in order to facilitate the growth of certain types of living organisms the dimensions of the texturing may have to be in the nanometer or in the micrometer range, while for facilitating the growth of certain other types of organisms, the dimensions of the texturing may have to be in the millimeter or centimeter range. Reproducing this texturing on surfaces that are large in size (e.g., of the area of several square centimeters) or on surfaces that have a complex shape (e.g., a non-planar surface that is circular or spherical) is difficult.

It is therefore desirable to have methods that can reproduce the texturing on surfaces that are large in size or disposed upon surfaces that have complex shapes or disposed upon surfaces located in regions that are difficult to access.

SUMMARY

Disclosed herein is a method comprising disposing upon a curved surface a soft mold; the curved surface comprising an organic polymer; the soft mold having an elastic modulus of about $10^5$ to about $10^8$ pascals and having disposed upon its surface a pattern; heating the curved surface to a temperature greater than the softening point of the organic polymer; inflating the soft mold to contact the curved surface; and impressing upon the curved surface an image of the pattern.

Disclosed herein too is a method comprising disposing upon a surface a soft mold; the soft mold having a pattern disposed upon it; heating the surface to a temperature greater than its softening point; inflating the soft mold to contact the surface; and impressing upon the surface an image of the pattern.

Disclosed herein too is a method comprising disposing a pattern upon a mandrel; extruding a polymer onto a surface of the mandrel; and impressing the pattern from the mandrel upon a surface of the polymer to manufacture a first pattern on the polymer.

Disclosed herein too is a method comprising disposing upon a surface a soft mold; the soft mold having a pattern disposed upon it; adding an uncured thermosetting polymer coating between the soft mold and the surface, and heating the surface to a temperature greater than the curing temperature of the thermosetting polymer to allow the soft mold to replicate into the thermosetting polymer coating.

Disclosed herein too is a method comprising disposing a polymer upon a surface of a device; disposing a mask upon a surface that is opposed to the surface upon which the polymer is disposed; the mask having a pattern; irradiating the device to react the polymer; and removing the unreacted polymer to form a pattern on the device; where the pattern corresponds to the pattern on the mask.

Disclosed herein too is a method comprising disposing upon a surface a mold; the mold having a pattern disposed upon it; heating the surface to a temperature greater than its softening point; inflating the mold to contact the surface; and impressing upon the surface an image of the pattern.

Disclosed herein too is a method comprising disposing upon a surface a mold; the mold having a pattern disposed upon it; and etching those portions of the surface that are not protected by the mold.

Disclosed herein too is an article comprising a curved surface; the curved surface having disposed thereon a plurality of patterns; each pattern being defined by a plurality of spaced apart features attached to or projected into the curved surface, the plurality of features each having at least one neighboring feature having a substantially different geometry, wherein an average spacing between adjacent ones of the features is between about 1 nanometer and about 1 millimeter in at least a portion of the curved surface, wherein the plurality of spaced apart features are represented by a periodic function.

Disclosed herein too is an article comprising a planar surface; the planar surface having disposed thereon a plurality of patterns; each pattern being defined by a plurality of spaced apart features attached to or projected into the curved surface, the plurality of features each having at least one neighboring feature having a substantially different geometry, wherein an average spacing between adjacent ones of the features is between about 1 nanometer and about 1 millimeter in at least a portion of the curved surface, wherein the plurality of spaced apart features are represented by a periodic function.

Disclosed herein too are articles that incorporate the aforementioned articles.

DETAILED DESCRIPTION

Figure 1:
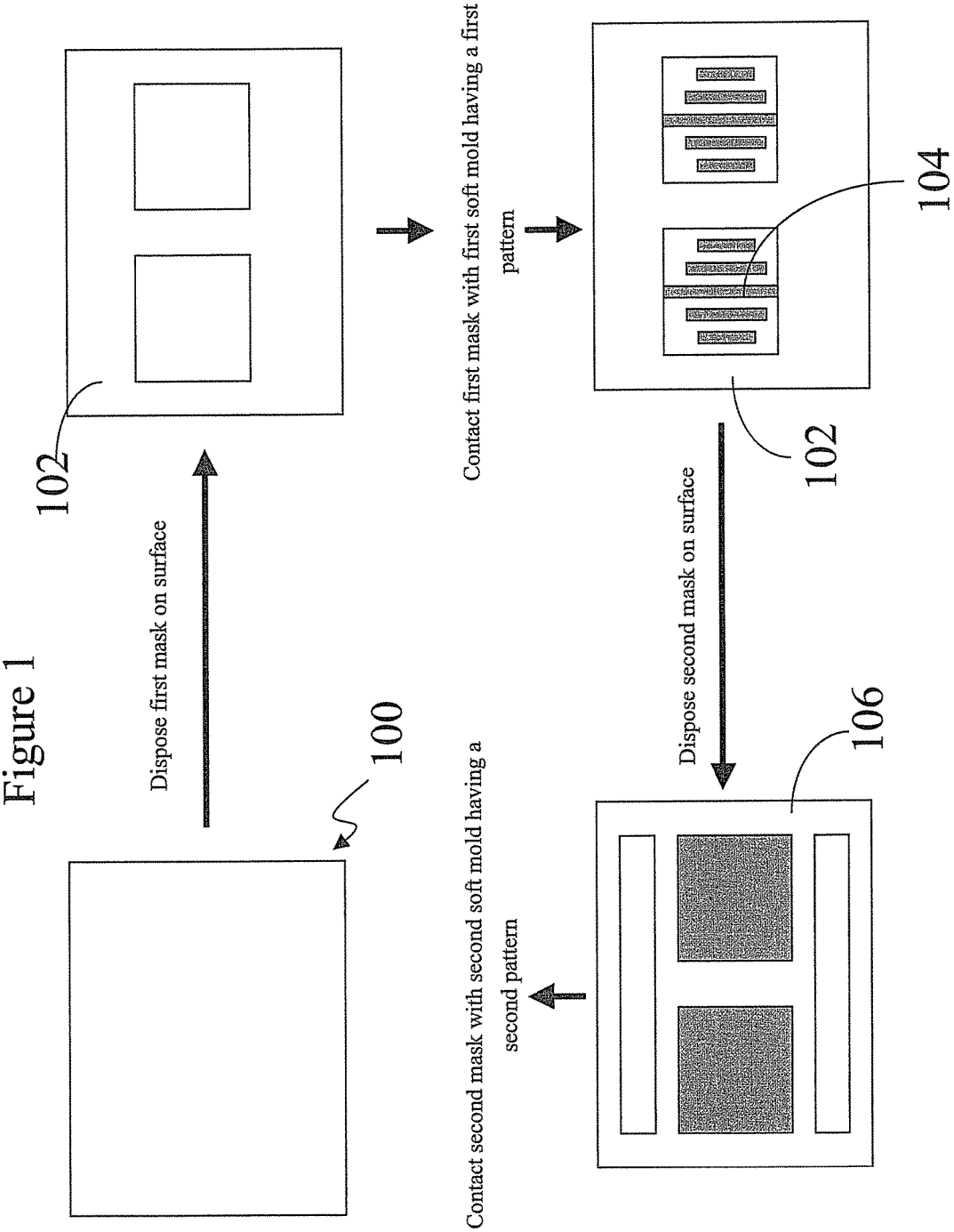
FIG. 1 depicts the use of a first mask and a second mask to dispose a first pattern on a surface.

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition phrase "comprising" is inclusive of the transition phrases "consisting essentially of" and "consisting of".

Disclosed herein is a method for manufacturing surfaces that have disposed upon them textures that can be used to control the adhesion of living or non-living matter. In one embodiment, the texturing can be used to minimize the adhesion of living or non-living matter, while in another embodiment, the texturing can be used to increase the adhesion of living or of non-living matter. The method of manufacturing permits the texturing of large surfaces that have complex non-planar surfaces, planar surfaces or complex planar surfaces.

In one embodiment, the method advantageously comprises texturing a surface with a pattern. The texturing of the surface can be conducted by techniques involving embossing, etching, and the like, so as to dispose the pattern upon the surface. The method permits a reproduction of the pattern across the surface. In another embodiment, the method also permits texturing a surface that is not easily accessible (e.g., the inside of a tube or a sphere) with a pattern that is reproduced across portions of the surface.

In one embodiment, the method encompasses an embossing technique for replicating pattern onto a curved surface of a device, where the surface of the device comprises a deformable material. The embossing technique involves disposing a soft mold (having an image of a desired pattern) or a solid mandrel against the surface of the device, and then heating the device while applying pressure on the soft mold or the solid mandrel against the surface of the device, so that it leaves an image of the pattern on the surface. The pressing of the soft mold or the solid mandreal against the surface of the device may be conducted by inflating the soft mold or expanding the solid mandrel. The inflating may be brought about by curing a thermosetting polymer contained in the soft mold or by solidifying a magnetorheological fluid or an electrorheological fluid that is pumped into the soft mold.

In one embodiment, a coating of a thermosetting or thermoplastic polymer is disposed between the surface of the device and the soft mold or solid mandrel. While the soft mold or solid mandrel is depressed against the surface of the device, the thermosetting polymer is cured thermally and/or by using radiation to leave a patterned surface on the surface of the device.

In one embodiment, the pattern generally has some features that are of the order of a few nanometers to several hundreds of millimeters in size. In another embodiment, the pattern is disposed on an inner surface of a device. The inner surface can be curved, planar, or a combination of a curved and planar surface. Exemplary curved surfaces of the devices are the inner and/or outer surfaces of spheres, hollow spheres, hemispheres, hollow hemispheres, cylinders, tubes, cones, hollow cones, or the like. Examples of planar surfaces are the plane inner and/or outer surfaces of pyramids, cubes, polygons, or the like.

The device may comprise a metal, a ceramic, an organic polymer, or a combination comprising at least one metal, ceramic or organic polymer. In an exemplary embodiment, the surface of the device to be patterned comprises an organic polymer.

Examples of suitable organic polymers are thermoplastic polymers, thermosetting polymers, blends of thermoplastic polymers, blends of thermosetting polymers, and blends of thermoplastic polymers with thermosetting polymers. The organic polymer can be a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers. An exemplary polymer for the surface of the device that is to be embossed is a thermoplastic polymer.

Examples of thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoro ethylene, fluorinated ethylene propylene, perfluoroalkoxyethylene, polychlorotrifluoroethylene, polyvinylidene fluoride, polysiloxanes, or the like, or a combination comprising at least one of the foregoing organic polymers.

Examples of thermosetting polymers suitable for use in the polymeric composition include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like.

An exemplary polymer for the inner surface of the device is a thermoplastic polymer that comprises polyvinylchloride, polydimethylsiloxane, polyolefins or fluorinated polymers.

In one embodiment, in one embodiment directed to embossing the pattern on the curved surface of the device, the soft mold or solid mandrel having an image of the desired pattern is positioned against the surface of the device and is then inflated or expanded to exert a pressure on a surface of the device. The surface of the device is simultaneously heated to a temperature above the softening point of the polymer present on the surface of the device. The softening point of the polymer can be the glass transition temperature for an amorphous polymer and/or the melting point for a semi-crystalline polymer. As the soft mold or solid mandrel is inflated or expanded against the softened polymer present on the surface of the device, it disposes an impression of the image from the soft mold on the surface of the device. The surface of the device is then cooled down to below its softening point and now has disposed upon it an image (or a negative image) of the pattern that is present on the soft mold or the solid mandrel. In one embodiment, the device can be subjected to radiation to cure the polymer thereby forming a pattern on the surface of the device. The radiation can comprise ultraviolet radiation, electron beam radiation, xray radiation, visible radiation, or the like, or a combination comprising at least one of the foregoing forms of radiation. The mold is then deflated and then removed from the surface of the device. The mold can be repeatedly used to form similar patterns on a plurality of devices. In the case of the expandable mandrel, it is collapsed to remove it from the surface of the device.

In one embodiment, the soft mold can be inflated using a fluid such as, for example, air, water, volatile organic solvents, oils, and the like, or a combination comprising at least one of the foregoing fluids. Fluids that can be easily heated are desirable. Heated fluids can facilitate the heating of the soft mold, which in turn can raise the temperature of the surface of the device above the softening point. The pressure and the temperature of the fluids can be controlled to vary the depth of the pattern in the curved surface.

In another embodiment, the soft mold can be inflated using magnetorheological fluids or electrorheological fluids. Fluid compositions that undergo a change in apparent viscosity in the presence of a magnetic field are referred to as Bingham magnetic fluids or magnetorheological fluids, while fluids that undergo a change in apparent viscosity in the presence of an electrical field are referred to as electrorheological fluids. Magnetorheological fluids generally include magnetizable particles dispersed or suspended in a carrier fluid. In the presence of a magnetic field, the magnetizable particles become polarized and are thereby organized into chains of particles or particle fibrils within the carrier fluid. The chains of particles act to increase the apparent viscosity or flow resistance of the fluid composition resulting in the development of a solid mass having a yield stress that must be exceeded to induce onset of flow of the magnetorheological fluid. When the flow of the fluid composition is restricted as a result of orientation of the particles into chains, the fluid composition is referred to as being in its "on state". The force required to exceed the yield stress is referred to as the "yield strength". In the absence of a magnetic field, the particles return to an unorganized or free state and the apparent viscosity or flow resistance of the fluid composition is then correspondingly reduced. The state occupied by the composition in the absence of a magnetic field is referred to as the "off-state".

In one embodiment, in one method of using magnetorheological fluids or electrorheological fluids, the fluids are discharged into the soft mold. The fluids are generally heated to temperature that is greater than or equal to about the softening point of the polymer surface prior to being introduced into the mold. The fluids can also be heated after being introduced into the mold. Upon filing the soft mold, either a magnetic field or an electrical field or a combination thereof is applied to the soft mold to promote the solidification of the magnetorheological fluid or the electrorheological fluid. Upon solidification, additional heat may be supplied to the soft mold, causing a thermal expansion of the magnetorheological fluid or the electrorheological fluid and leaving an imprint on the curved surface of the device. After forming the imprint, the curved surface is cooled down to below the softening point of the curved surface and the magnetic and/or the electrical field is removed from the magnetorheological fluid or the electrorheological fluid. The magnetorheological fluid or the electrorheological fluid is now free to be discharged from the soft mold and the mold is removed from the embossed curved surface. The soft mold along with the magnetorheological fluid or the electrorheological fluid can be reused to reproduce the pattern on another curved surface.

In another embodiment, directed to embossing the pattern on the curved surface of the device, the soft mold having an image of the desired pattern is disposed against a surface of the device. The soft mold is then filled with an uncured precursor to a thermosetting polymer. The temperature of the curved surface of the device as well as the temperature of the soft mold is increased. As the temperature of the soft mold is increased, the uncured precursor begins to cure to form a solid that comprises a thermosetting polymer. The solidification and consequent expansion of the thermosetting polymer causes the soft mold to form a pattern on the curved surface of the device. The thermosetting polymer is thus disposed on the curved surface. In one embodiment, the thermosetting polymer is fused or bonded to the curved surface.

The hardening of the thermosetting polymer inside the soft mold exerts a hydrostatic pressure on the mold, which facilitates conformal contact of the micro-structured soft mold to the curved surface of the device. After the thermosetting polymer is cured, the temperature is reduced to thereby causing the curved surface to solidify. This permits the soft mold to be separated from the curved surface leaving a faithful reproduction of the pattern on the curved surface of the device. A list of thermosetting polymers is provided above and any of these polymers can be used to facilitate the production of the pattern.

It is generally desirable for the softening temperature of the curved surface to be proximate to the curing temperature of the thermosetting polymer, so that a single source of heat can be used to cure the thermosetting polymer and soften the curved surface at the same time. In one embodiment, the curing temperature of the thermosetting polymer is about ±25° C. from softening temperature of the curved surface, specifically about ±20° C. from softening temperature of the curved surface, and more specifically about ±15° C. from softening temperature of the curved surface.

In one embodiment, the precursor to the thermosetting polymer in the soft mold can be cured by irradiation.

The soft mold can be manufactured from an elastomer. The elastomers can be chemically crosslinked or physically crosslinked. The elastomers can be cured by sulfur or non-sulfur vulcanization if desired. Saturated rubbers that cannot be cured by sulfur vulcanization may also be used if desired.

Examples of suitable elastomers are polydimethylsiloxane, polybutadiene, polyisoprene, styrene-butadiene-styrene (SBS), styrene-isoprene-styrene (SIS), styrene-ethylene/butylene-styrene (S-EB-S) block copolymers, thermoplastic polyurethanes, copolyester-ethers (block copolymers derived from terephthalic acid, polytetramethylene glycol, and 1,4-butanediol), natural rubber, synthetic polyisoprene, butyl rubber, halogenated butyl rubbers, polybutadiene, styrene-butadiene rubber, nitrile rubber, hydrogenated nitrile rubbers, chloroprene rubber, polychloroprene, ethylene propylene rubber, and ethylene propylene diene rubber, epichlorohydrin rubber, polyacrylic rubber, silicone rubber, fluorosilicone rubber, fluoroelastomers, perfluoroelastomers, polyether-block-polyamides, chlorosulfonated polyethylene, ethylene-vinyl acetate, or the like, or a combination comprising at least on of the foregoing block elastomers. An exemplary elastomer is a polysiloxane mold.

In one embodiment, the soft mold comprises one material that has an elastic modulus of about $10^5$ pascals to about $10^8$ pascals. In another embodiment, the soft mold can comprise a surface that is metallized with a metal such as aluminum, copper, brass or the like.

In one embodiment, the soft mold is in the form of a balloon that can be inflated using a fluid. While the aforementioned method has been described as employing a soft mold, a hard solid mandrel, can also be used. An expandable mandrel that is spring loaded or manufactured from a shape memory alloy can also be used to impress a pattern upon the curved surface.

In all of the aforementioned embodiments, the application of pressure is sufficient for the softened tube material to flow into the recesses of the soft mold.

In yet another embodiment, directed to embossing the pattern on the curved surface of the device, the soft mold having an image of the desired pattern is disposed against a surface of the device. Both sides of the soft mold (the inner surface and the outer surface) are then filled with an uncured precursor to a thermosetting polymer. The temperature of the curved surface of the device as well as the temperature of the soft mold is increased. As the temperature of the soft mold is increased, the uncured precursor begins to cure to form a solid that comprises a thermosetting polymer. The uncured precursor in the soft mold and that disposed on the inner surface can be cured by irradiation (e.g., microwave radiation, ultraviolet radiation, xray radiation, electron beam radiation). In one embodiment, the uncured precursor in the soft mold can be heated thermally while the uncured precursor on the surface can be cured using radiation. In another embodiment, the uncured precursor in the soft mold can be heated by radiation while the uncured precursor on the surface can be heated thermally to undergo curing. A combination of radiation and thermal heat may be sequentially or simultaneously applied to cure the uncured precursor inside or outside the soft mold.

The solidification and consequent expansion of the thermosetting polymer causes the soft mold to form a pattern on the thin layer of thermosetting polymer present between the soft mold and the curved surface of the device. After the thermosetting polymer is cured, the temperature is reduced and the soft mold is permitted to be separated from the thin layer of cured thermosetting polymer on the surface of the device. This leaves a faithful reproduction of the pattern on the thin layer of cured thermosetting polymer attached to the curved surface of the device. In one embodiment, when a fluid (e.g., a magnetorheological fluid, an electororheological fluid) is used to expand the soft mold, it can be deflated by reducing the fluid pressure to remove the soft mold from the curved surface.

In another embodiment, a cylindrical mold or an expandable mandrel with an image of the pattern on its surface is dip coated in a polymer-solvent dispersion to dispose the pattern on the curved surface of a thin-walled tube when the polymer hardens. The hardening of the polymer may occur through the drying of the polymer by removal of the solvent, the crosslinking of the polymer, or a combination thereof.

The resulting thin-walled, patterned tube can be removed from the cylindrical mold and used as a tubular sheath; the tubular sheath can be attached to the inside surface of a separate tube or inverted and attached to the outside surface of a separate tube. The tubular sheath can be used as a template for making other patterned surfaces. In one embodiment, the tubular sheath can be used to mass-produce faithful reproductions the patterned surface.

In addition, the final tube can be constructed with compression or extrusion molding by forming a tube with thermosetting or thermoplastic polymer around or inside of the previously formed thin-walled patterned sheath. In addition, the resulting thin-walled, patterned tube can be used directly as a catheter.

The resulting thin-walled, patterned tube can have a wall thickness of about 5 nanometers to about 1,000 micrometers, specifically about 10 nanometers to about 500 micrometers, and more specifically about 20 nanometers to about 100 micrometers. The thin-walled tube can be manufactured from one or more of the polymers or elastomers listed in this disclosure.

The cylindrical mold can be created by mechanical micromachining with wire electro-discharge machining (EDM) or computer numerical control (CNC) techniques using a diamond tip corresponding to the size of the pattern features. The diamond tip can be shaped with ion beam cutting techniques.

In another embodiment, directed to replicating the pattern on the curved surface of a device, the soft mold having an image of the desired pattern is attached to the surfaces of a mold used for compression or injection molding said device.

In another embodiment, the patterning of a curved surface can be accomplished by etching. A mask having a pattern disposed therein can be used as a template. The mask has a shape that is complimentary to the shape of the surface of the device that is to be patterned. It can therefore fit snugly on the surface without any play between the surface and the mask. The surface with the mask disposed thereon is then exposed to etching. Examples of suitable etching are chemical etching, ion beam etching, reactive ion etching, mechanical abrasion, electron beam etching, or combinations of at least one of the foregoing forms of etching. The etching causes the exposed portions of the surface to be degraded or to be removed thereby producing a pattern on the surface. As with the embossing described above, the etching can be conducted on non-planar surfaces (e.g., curved surfaces), planar surfaces, and surfaces that combine non-planar surfaces with planar surfaces. The etching can be conducted on inner surfaces, outer surfaces as well as surfaces that form both inner and outer surfaces. In one embodiment, a combination of etching or embossing can be used to produce a pattern on a surface.

Figure 2:
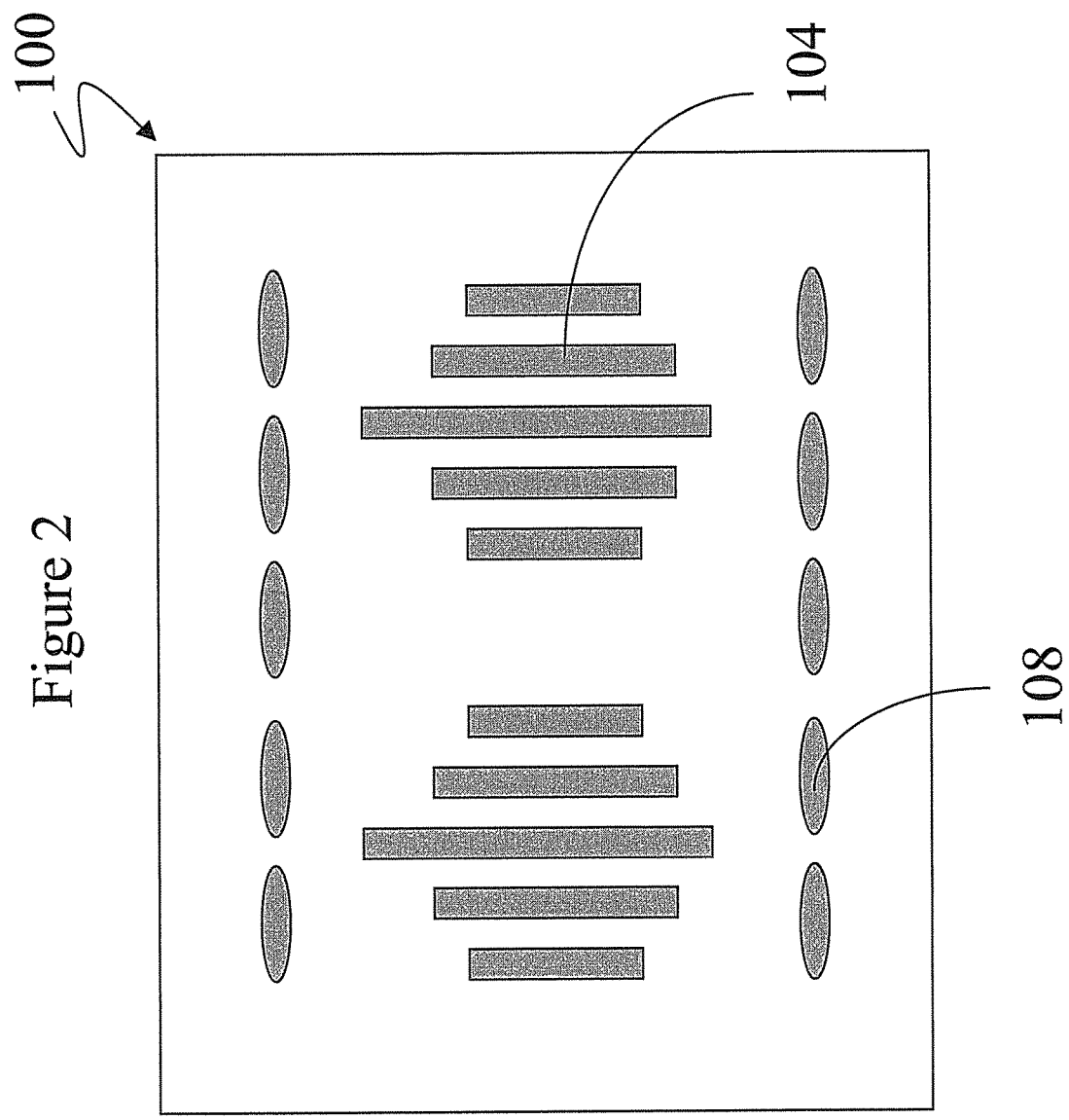
FIG. 2 reflects the surface after the development of the second pattern.

In another embodiment, a mask or a plurality of masks can be used to produce the pattern only on selected portions of the curved surface. In yet another embodiment, the mask or the plurality of masks can be used to produce different patterns on selected portions of the curved surface. This example is demonstrated in the FIGS. 1 and 2, where a first mask 102 is disposed on a surface 100 and a first soft mold (or a first expandable mandrel) having a first replica (or an opposing image of the first replica) of the first textured surface contacts the surface of the device. A first polymer is disposed on either the surface of the first soft mold or the surface of the device after the first mask is placed on the surface of the device. Upon contacting the flat surface with the first soft mold (or the first expandable mandrel), the first polymer is patterned to produce a first pattern 104 on the surface. The first polymer may be cured, dried or cured and dried to produce the first pattern.

Following this, a second mask 106 is disposed on the surface. In one embodiment, the second mask 106 can protect those portions of the surface that are already patterned, while permitting other portions of the surface to be patterned with a second soft mold (or a second expandable mandrel) having a second replica (or an opposing image of the second replica). A second polymer may be disposed on either the surface of the second soft mold or the surface of the device after the second mask is placed on the surface of the device. Upon contacting the flat surface with the second soft mold (or the second expandable mandrel), the second polymer is patterned to produce a second pattern 108 on the surface. This is depicted in the FIG. 2. The surface may be flat or curved. In an exemplary embodiment, the surface is curved.

In this manner, a plurality of masks can be disposed upon the surface 100 and a plurality of soft molds can be used to dispose a plurality of patterns each pattern comprising a different polymer.

In another embodiment, the second mask can be used to cover only portions of the first pattern 104 and to perform secondary operations on the first pattern. In one embodiment, the first mask can be the same or different as the second mask. In another embodiment, the first soft mold can be the same or different as the second soft mold. In yet another embodiment, the first polymer can be the same or different as the second polymer.

Figure 5:
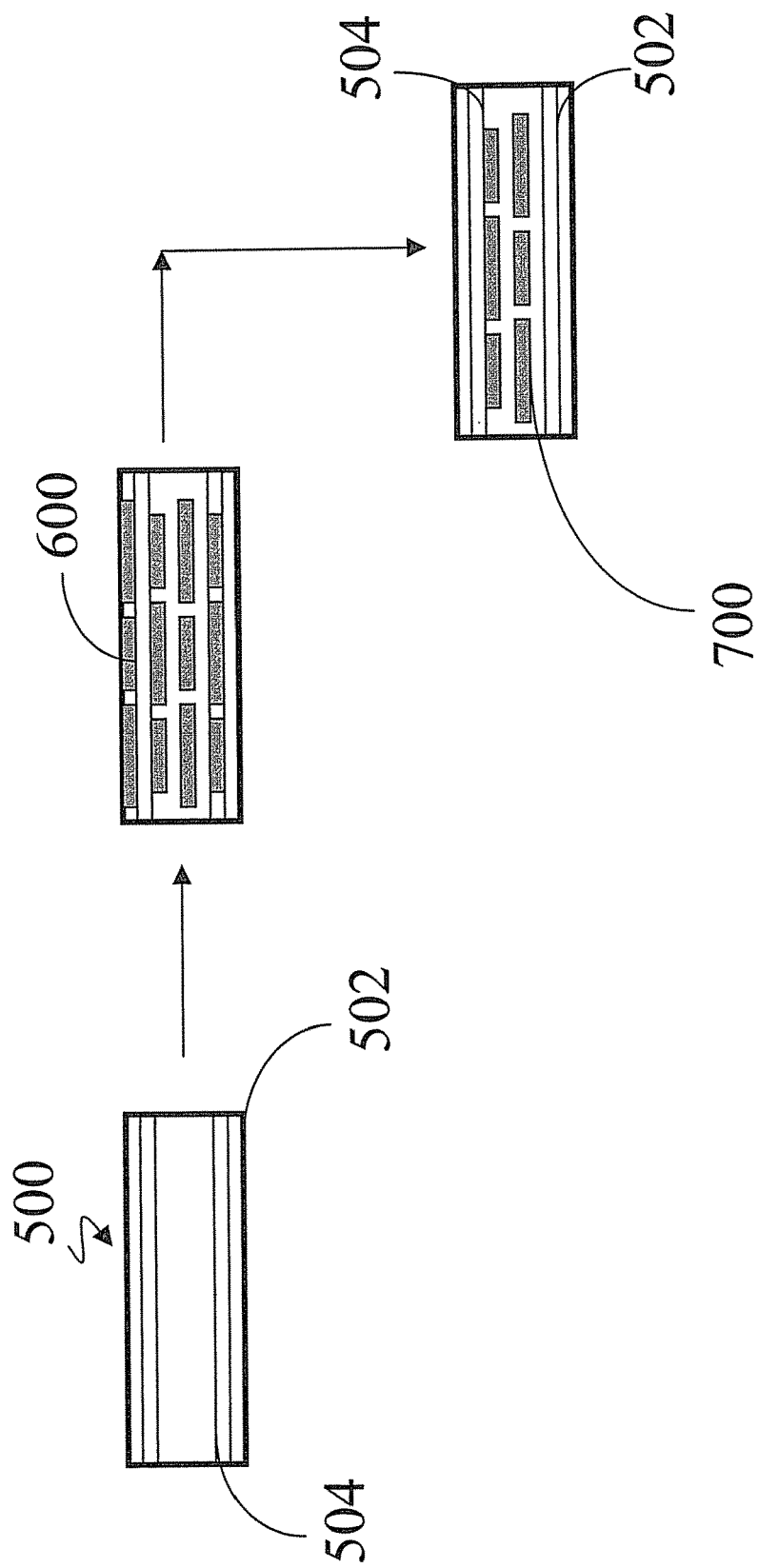
FIG. 5 depicts a method where the pattern is disposed on the inside of a coextruded tube.

In yet another embodiment, the pattern can be reproducibly disposed on the inner or outer surface of a tube by using a mandrel and processing the tube by a method involving extrusion or coextrusion. The mandrel can be manufactured from a metal, a ceramic or a plastic that generally has a melting point that is higher than the temperature of the tube. It is generally desirable to use a mandrel that comprises a ceramic or a metal. It is desirable for the mandrel to have a hardness that is greater than that of the material used to manufacture the tube. In one embodiment, the mandrel is a solid mandrel (unlike the mandrel depicted in the FIG. 5 which will be discussed in detail later). When the mandrel is a solid mandrel, the pattern is disposed on the outer surface. In another embodiment, the mandrel is a hollow mandrel that has the pattern disposed on the inner surface. In another embodiment, the mandrel is an expandable mandrel that can be expanded when desired to imprint the inner surface of the tube with a pattern. After impressing the inner surface of the tube, the mandrel can be collapsed and removed from the tube. Expandable mandrels can be spring loaded, have expanding coils, and the like to expand when desired.

In order to extrude or to co-extrude the pattern onto the inside of the tube, the pattern has first to be disposed onto the outer surface of the mandrel. In one embodiment, in disposing the pattern on to the outer surface of the mandrel, the outer surface of the mandrel is coated with a layer of a deformable material (e.g., a thermoplastic polymer, a thermosetting polymer, or the like). A template having the desired pattern disposed on the inner surface is then brought into contact with the outer surface of the mandrel. An appropriate pressure may be brought to bear upon the template so as to deform the deformable material on the outer surface of the mandrel. The pattern is disposed onto the deformable material. Heat and pressure may be used to assist the formation of a pattern during the deformation process. The deformable material is then hardened either by cooling or crosslinking and a pattern is thus disposed on the outer surface of the mandrel.

In one embodiment, the mandrel may comprise a metal or a ceramic into which the pattern is cut or etched. Chemical etching, reactive ion etching, and the like, may be used to dispose the pattern on the outer surface of the mandrel. In one embodiment, the mandrel may comprise a shape memory alloy whose dimensions can be reversibly changed to form a pattern on the inside of the tube and then easily extracted from the inside of the tube. The mandrel generally has a hardness that is greater than that of the tube.

Figure 3:
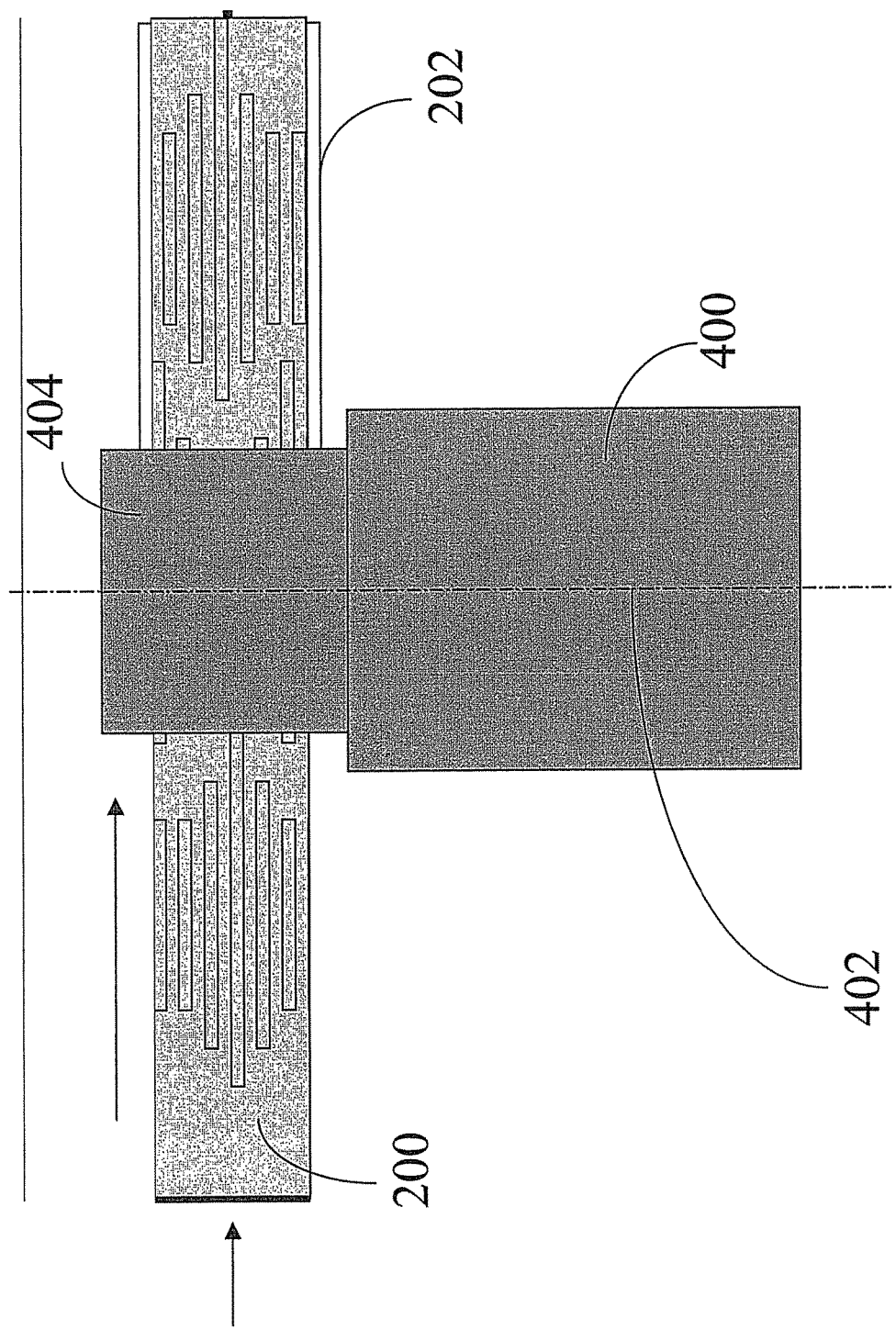
FIG. 3 depicts an exemplary method where the pattern is disposed on the inside of a tube by extruding the tube onto a patterned mandrel.

FIG. 3 depicts a method of extruding or co-extruding the pattern onto the inside of the tube. Crosshead extrusion can be used to dispose the tube on the outside of a solid mandrel or to dispose the tube on the inside of a solid mandrel. As can be seen in the FIG. 3, the mandrel 200 (with the pattern disposed thereon) travels through the die of the extruder in a direction that is perpendicular to the axis 402 of the screw in extruder 400. As the mandrel 200 exits the die 404, it is coated with a layer of polymer that forms the tube 202. An image (or an opposing image) of the pattern on the mandrel is transferred to the inside of the tube 202. The image of the pattern on the mandrel can be transferred to the tube 202 by applying pressure to the outside of the tube. In one embodiment, roll pressing can be used to depress the tube 202 on to the mandrel 200.

The tube 202 with or without the mandrel may be subjected to additional thermal or mechanical processes. In one embodiment, the tube 202 may be optionally subjected to curing in an oven while on the mandrel 200. After being cured, the tube 202 is removed from the mandrel 200 and cut into desired sizes.

Figure 4:
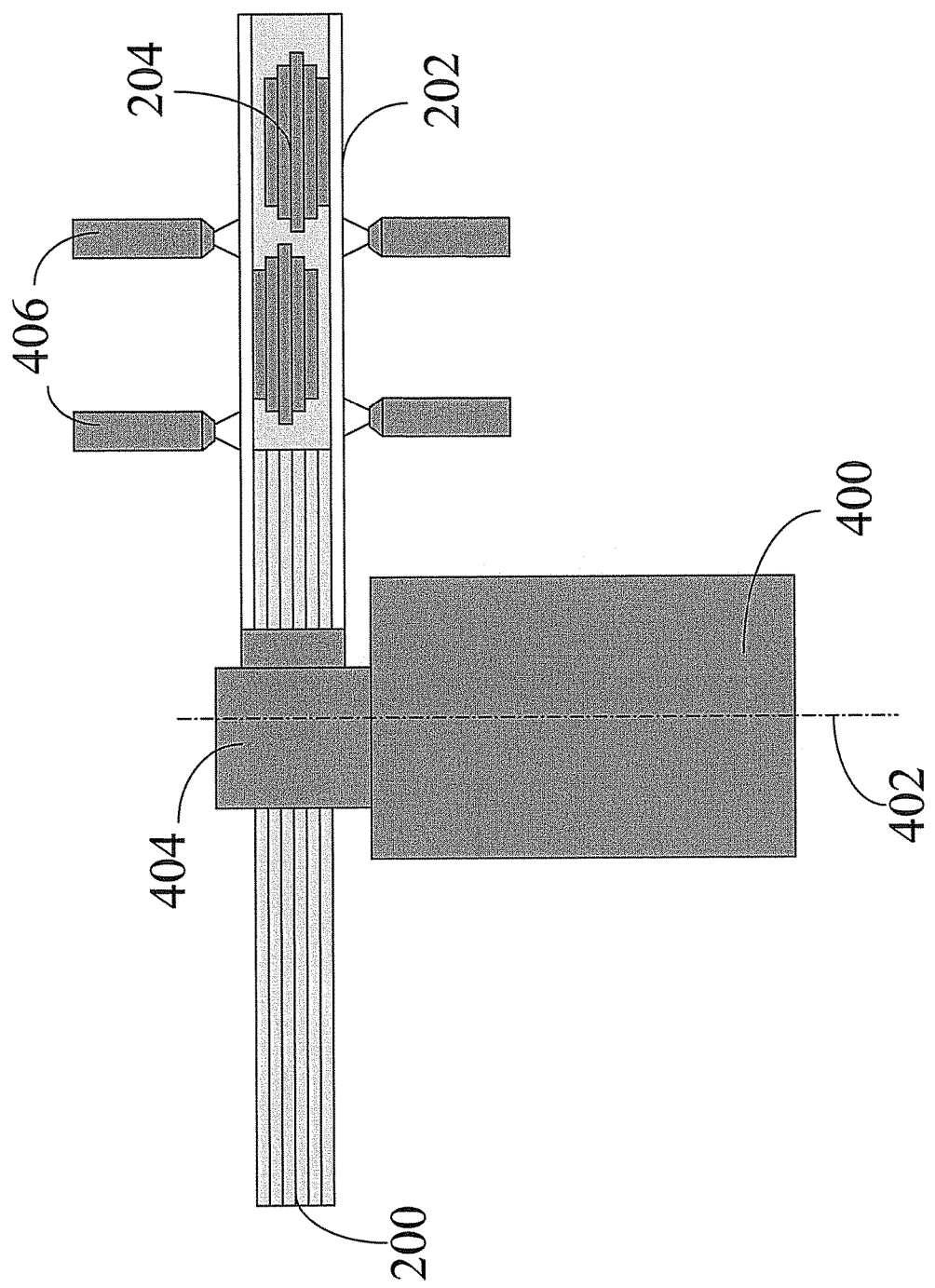
FIG. 4 depicts another exemplary method where the pattern is disposed on the inside of a tube by extruding the tube onto a partially patterned mandrel. Electromagnetic radiation is then used to form the remainder of the pattern.

In another embodiment depicted in the FIG. 4, a combination of extrusion and exposure to selected forms of electromagnetic radiation may be used to form a pattern on the tube. During the extrusion process a portion of the pattern (i.e., a partial pattern) is disposed on the surface of the tube. A secondary process such as etching, irradiation, or the like, is then conducted on this partial pattern to form the completed pattern.

In the FIG. 4, the mandrel 200 has linear grooves disposed along the longitudinal axis. The distance between the longitudinal grooves is equal to the desired spacing between the features of the pattern. The spacing between the features on the mandrel may be about 1 nanometer and about 1 millimeter. Upon undergoing extrusion as shown in the FIG. 4, a tube 202 is disposed upon the mandrel 200. An image (or an opposing image) of the pattern present on the outer surface of the mandrel is transferred to the tube 202. In order to form additional patterns on the tube, portions of the tube may be subjected to irradiation using an irradiation source 406. The irradiation source 406 can be moved to create a multiplicity of patterns. Any form or electromagnetic radiation can be used to form the second pattern 204. Examples of suitable forms of electromagnetic radiation for further processing of the pattern are ultraviolet radiation, xray radiation, electron beam radiation, or the like.

The electromagnetic radiation may be used to crosslink portions of the polymer or to degrade portions of the polymer in the partial pattern thereby converting the partial pattern into a final pattern. The uncrosslinked portions of the polymer or the degraded portions of the polymer on the tube may then be removed by secondary process such as solvent extraction. The tube 202 with or without the mandrel may be subjected to additional thermal or mechanical processes. In one embodiment, the tube 202 may be optionally subjected to curing in an oven while on the mandrel 200. After being cured, the tube 202 is removed from the mandrel 200 and cut into desired sizes.

The tube 202 may be removed from the mandrel 200 by expanding the tube 202 and/or shrinking or collapsing the mandrel 200. It is desirable to remove the tube 202 from the mandrel 200 without damaging the pattern. When the mandrel comprises a shape memory alloy, the mandrel after having the tube disposed on it may be heated to a temperature at which it returns to its original shape. The original shape is smaller than the shape at which the tube is disposed onto the mandrel. The shrinkage of the mandrel permits it to be removed from the tube without any substantial damage to the pattern. In one embodiment, the diameter of the mandrel may be reduced by subjecting it to tensile deformation in the longitudinal direction.

In another embodiment, an extruded tube or a plurality of coextruded tubes may be subjected to radiation to form the pattern on the inside of the outside of the tube. The pattern is formed by irradiating the tube through a mask that has the desired pattern on it. This method of making a patterned tube is disclosed in the FIG. 5 where a coextruded tube 500 comprising an outer tube 502 and an inner tube 504 is subjected to irradiation. The inner tube generally comprises a material that can undergo a change in chemistry upon being irradiated. A mask 600 having the desired pattern is disposed on either the outside or the inside of the tube. The tube 500 is then irradiated through the mask. The material used in the inner tube 504 then undergoes a change in chemistry (e.g., it undergoes a reaction to form crosslinks, or undergoes scission, or degrades).

Two photon technology can also be used to form the pattern 700 on the inner or on the outer tube or at any point therebetween. Two photon technology is based upon the combination of photo-catalysis and enhanced activation through the focused application of multiple photons simultaneously within an extremely small volume. Two laser beams with wavelengths that are multiples of the activation or excitation state of the photosensitive catalyst, increase the number of photos simultaneously within the focal volume wherein the accumulated intensity is exceedingly large. Thus the polymerization of the monomers or polymerizable polymers is enhanced and occurs very rapidly. By selective movement of either the laser system or the substrate within the focal distance of the laser enables the patterning of the polymerizable material with resolutions at the micron and nanometer size. Additionally one can further enhance the process on the internal lumen of a tube by use of x-ray or other wavelengths that readily penetrate materials that may be either UV adsorbing, visible light absorbing or IR absorbing. The result of the ability to focus the beam or beams of energy on such small volumes and move the focus enables the rapid polymerization over large dimensions with micron or nanometer resolution. The resulting polymerized material is thus patterned and adhered to the internal curved surface. The remaining un-polymerized material can be subsequently washed away or left as a second composition of material separating the patterned material.

The inner tube may then be subjected to secondary processing to remove uncrosslinked or degraded portions to form the pattern 700 on the inner tube 504. Secondary processing can include washing with a suitable solvent, mechanical degradation, etching, and the like.

Figure 6:
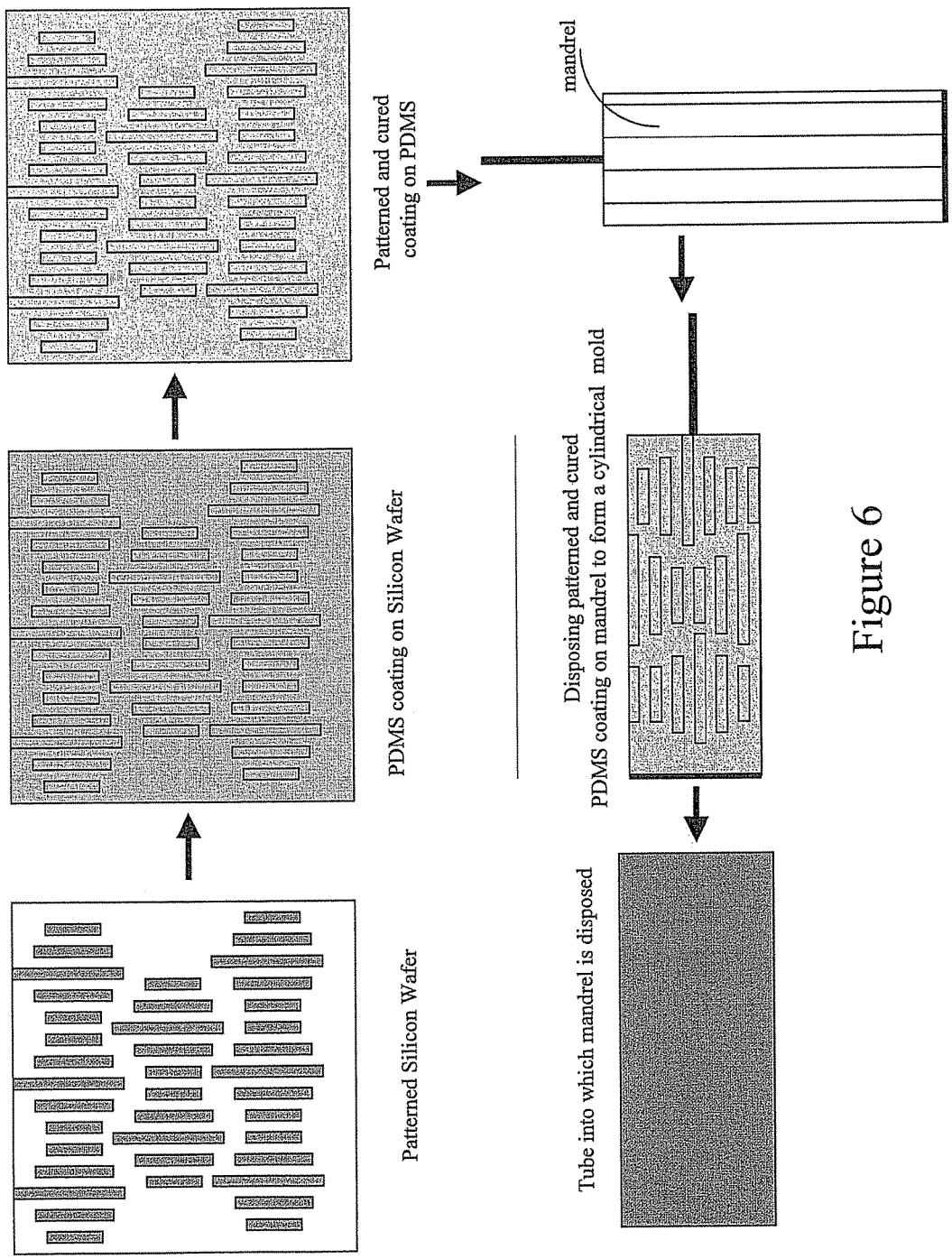
FIG. 6 depicts a method where the pattern is disposed on the inside of a tube.

The FIG. 6 depicts one method of disposing the pattern onto the inside of the tube. In order to dispose the pattern, it has first to be disposed onto the outer surface of the mandrel. In one embodiment, in disposing the pattern on to the outer surface of the mandrel, the outer surface of the mandrel is coated with a layer of a deformable material (e.g., a thermoplastic polymer, a thermosetting polymer, or the like). A template having the desired pattern is then contacted with the layer of deformable material. An appropriate pressure may be brought to bear upon the template so as to deform the deformable material on the outer surface of the mandrel. The pattern is disposed onto the deformable material. Heat and pressure may be used to assist the formation of a pattern during the deformation process. The deformable material is then hardened either by cooling or crosslinking and a pattern is thus disposed on the outer surface of the mandrel.

In one embodiment, the deformable material may be pressed onto a silicon wafer. The silicon wafer has disposed upon it the desired pattern. Upon hardening, the deformable material with the pattern disposed on it may be wrapped around the mandrel. As noted above, the mandrel may be an expandable mandrel.

The mandrel with the pattern disposed thereon is introduced into the inside of a tube that is desired to be patterned. The inside of the tube may be coated with a thermosetting polymer. By expanding the mandrel while simultaneously heating and/or irradiating the tube, the pattern can be disposed on the thermosetting polymer on the inside of the tube. The patterned thermosetting polymer may be in the form of a film. The mandrel is then collapsed to remove it from the inside of the tube. The process can be repeated. The patterned film can then be removed from the inside of the tube and can be disposed on the inside or on the outside of another tube.

In an exemplary embodiment, the pattern is reproducibly disposed across a curved surface of the device. In yet another exemplary embodiment, the pattern is reproducibly disposed across a curved inner surface. In yet another exemplary embodiment, the pattern is reproducibly disposed across a planar inner surface of the device. In yet another exemplary embodiment, the pattern is reproducibly disposed across a planar inner surface and a planar outer surface.

The device or article has a topography that comprises a plurality of patterns. Each pattern is defined by a plurality of spaced apart features attached to or projected into the curved surface. The plurality of features on the surface each having at least one neighboring feature that has a substantially different geometry. The average spacing between adjacent features on the surface is between about 1 nanometer and about 1 millimeter in at least a portion of the curved surface. In one embodiment, the plurality of spaced apart features are represented by a periodic function. In another embodiment, the plurality of spaced apart features form a pattern. Each pattern is separated from a neighboring pattern by a pathway that has a periodicity to it. The periodicity of this pathway may be sinusoidal.

In one embodiment, the article can comprise a pattern that comprises a plurality of spaced features. The spaced features are arranged in a plurality of groupings. The groupings of features comprise repeat units that can be repeated laterally across the surface. The spaced features within a grouping are spaced apart at an average distance of about 1 nanometer to about 500 micrometers. Each spaced feature has a surface that is substantially parallel to a surface on a neighboring feature. Each feature is separated from a neighboring feature and the groupings of features are arranged with respect to one another so as to define a tortuous pathway.

In yet another embodiment, the article comprises a plurality of spaced features. The features are arranged in a plurality of groupings such that the groupings of features comprise repeat units. The spaced features within a grouping are spaced apart at an average distance of about 1 nanometer to about 500 micrometers. The groupings of features are arranged with respect to one another so as to define a tortuous pathway where a tangent to the tortuous pathway intersects with a spaced feature. The spaced feature is different in geometry (shape or size) from each nearest neighbor and is not in contact with the nearest neighbor.

In yet another embodiment, the surface has a topography that comprises a pattern defined by a plurality of spaced apart features attached to or projected into a base surface of the device (i.e., the base surface of the article). The plurality of features comprise at least one feature having a substantially different geometry, wherein neighboring patterns share a common feature, the plurality of spaced apart features having at least one dimension that is about 1 nanometer to about 1,000 micrometers. The neighboring spaced apart features can be spaced apart by a distance of about 5 nanometers to about 500 micrometers, specifically about 10 nanometers to about 100 micrometers, specifically about 1 micrometer to about 50 micrometers, and more specifically about 2 micrometers to about 25 micrometers.

In yet another embodiment, the surface after the texturing comprises a plurality of spaced features; the features being arranged in a plurality of groupings; the groupings of features comprising repeat units; the spaced features within a grouping being spaced apart at an average distance of about 1 nanometer to about 200 millimeters; the groupings of features being arranged with respect to one another so as to define a tortuous path. In one embodiment, a tangent to the tortuous path intersects with at least one of the features. In another embodiment, the tortuous path can be represented by a periodic function. The periodic function may be sinusoidal.

In one embodiment, when viewed in a second direction, the pathway between the features may be non-linear and non-sinusoidal. In other words, the pathway can be non-linear and aperiodic. In another embodiment, the pathway between the features may be linear but of a varying thickness. The plurality of spaced features may be projected outwards from a surface or projected into the surface. In one embodiment, the plurality of spaced features may have the same chemical composition as the surface. In another embodiment, the plurality of spaced features may have a different chemical composition from the surface.

The composition of the surface and/or the base article comprises a polymer, a metal or an alloy, a ceramic. Combinations of polymers, metals and ceramics may also be used in the surface or the base article. The surface has a topography comprising a plurality of patterns; each pattern being defined by a plurality of spaced apart features attached to or projected into the base article. It is to be noted that each of the features of the plurality of features are separated from each other and do not contact one another.

In one embodiment, the surface is monolithically integrated with said base article, wherein a composition of the base article is the same as the composition of the surface. In another embodiment, the surface comprises a coating layer disposed on the base article. In yet another embodiment, the composition of the coating layer is different from the composition of the base article. In one embodiment, the polymer comprises a non-electrically conducting polymer.

In another embodiment, the topography provides an average roughness factor (R) of from 2 to 50. The surface may comprise an elastomer that has an elastic modulus of about 10 kPa to about 10 MPa.

As noted above, the pattern is separated from a neighboring pattern by a tortuous pathway. The tortuous pathway may be represented by a periodic function. The periodic functions may be different for each tortuous pathway. In one embodiment, the patterns can be separated from one another by tortuous pathways that can be represented by two or more periodic functions. The periodic functions may comprise a sinusoidal wave. In an exemplary embodiment, the periodic function may comprise two or more sinusoidal waves.

In another embodiment, when a plurality of different tortuous pathways are represented by a plurality of periodic functions respectively, the respective periodic functions may be separated by a fixed phase difference. In yet another embodiment, when a plurality of different tortuous pathways are represented by a plurality of periodic functions respectively, the respective periodic functions may be separated by a variable phase difference.

In one embodiment, the plurality of spaced apart features have a substantially planar top surface. In another embodiment, a multi-element plateau layer can be disposed on a portion of the surface, wherein a spacing distance between elements of said plateau layer provide a second feature spacing; the second feature spacing being substantially different when compared to the first feature spacing.

In one embodiment, each feature of a pattern has at least one neighboring feature that has a different geometry (e.g., size or shape). A feature of a pattern is a single element. Each feature of a pattern has at least 2, 3, 4, 5, or 6 neighboring features that have a different geometry from the feature. In one embodiment, there are at least 2 or more different features that form the pattern. In another embodiment, there are at least 3 or more different features that form the pattern. In yet another embodiment, there are at least 4 or more different features that form the pattern. In yet another embodiment, there are at least 5 or more different features that form the pattern.

In another embodiment, at least two identical features of the pattern have at least one neighboring feature that has a different geometry (e.g., size or shape). A feature of a pattern is a single element. In one embodiment, two identical features of the pattern have at least 2, 3, 4, 5, or 6 neighboring features that have a different geometry from the identical features. In another embodiment, three identical features of the pattern have at least 2, 3, 4, 5, or 6 neighboring features that have a different geometry from the identical features.

In another embodiment, each pattern has at least one or more neighboring patterns that have a different size or shape. In other words, a first pattern can have a second neighboring pattern that while comprising the same features as the first pattern can have a different shape from the first pattern. In yet another embodiment, each pattern has at least two or more neighboring patterns that have a different size or shape. In yet another embodiment, each pattern has at least three or more neighboring patterns that have a different size or shape. In yet another embodiment, each pattern has at least four or more neighboring patterns that have a different size or shape.

As noted above the chemical composition of the spaced features can be different from the surface. The spaced features and the surfaces from which these features are projected or projected into can also comprise organic polymers or inorganic materials.

In one embodiment, the pattern comprises a coating layer disposed on said base article. In other words, the coating layer comprises the pattern and is disposed on the base article.

The method of texturing disclosed herein may be advantageously used to pattern surfaces having a non-planar geometry. Curved surfaces on the outside or the inside of tubes, spheres, cylinders, cones, polygons, or the like may be produced.

The texturing can also be performed by imprinting instead of coating. For example, it can be produced by stamping it onto a finished surface. In one embodiment, it can be injection molded onto a surface of an existing device. In another embodiment, it can be directly injection molded during the production of the device. It can also be produced on surfaces during blow molding, vacuum forming, extrusion, molding, and the like. Imprinting and injection molding can be conducted on surfaces that comprise metals, glasses, polymers, ceramics, composites, or a combination comprising at least one of the metals, glasses, polymers, ceramics and/or composites.

Attached to this document are examples demonstrating how the texturing of a curved surface on the inside of a tube is conducted.

The articles manufactured by this method may be used in a wide variety of applications. The articles may find utility in biomedical implants, such as breast plant shells or other fluid filled implant shells; biomedical instruments, such as heart valves; hospital surfaces (e.g., consider film (electrostatic) applications to surfaces that can be readily replaced between surgeries); clothing/protective personal wear; biomedical packaging, such as, for example, the outside surface of sterilized packaging; clean room surfaces, such as, for example, the semiconductor or biomedical industry; food industry, such as, for example, food packaging, food preparation surfaces; marine industry, such as, for example, exterior surfaces of marine vessels including ships and associated bilge tanks, gray water tanks and water inlet/outlet pipes; water treatment plants, such as, for example, pumping stations; power plants; airline industry; furniture industry, such as, for examples, for children's cribs, handles on exercise equipment, and exercise equipment; in the transportation industry, such as, for example, in ambulances, buses, public transit; swimming pools and other structures that are used in aquatic environments; and the like. Additional details of the types of articles and surfaces upon which the pattern can be disposed are provided below.

The pattern may be used in articles that include medical devices, medical implants, medical instruments that are used internal or external to the body of living beings. The term "living beings" can include warm blooded animals, cold blooded animals, trees, plants, mammals, fishes, reptiles, amphibians, crustaceans, and the like. The medical devices, medical implants and medical instruments may be temporarily or permanently inserted into the body of the living being. Examples of medical devices, medical implants and medical instruments are endotracheal tubes; stents; shells used to encapsulate implants such as, for example, breast implant shells; breast implants; ear tubes; cochlear implants, heart valves; surfaces of bone implants; surfaces of grafted tissues; surfaces of contact lens; components and surfaces of dialysis management devices such as, for example, a dialysis line; components and surfaces of urinary management devices such as, for example, a urinary catheter; components and surfaces of central venous devices such as, for example, a urinary catheter; surfaces of implanted devices such as, for example, pacemakers, artificial pancreas, components and surfaces of orthopedic implants such as hips, knees, shoulders, elbows; components and surfaces of prosthetics such as legs, arms, feet, hands; ports on catheters such as, for example, feeding tube ports, implanted venous access ports. It is to be noted that the patterns can be varied to permit bioadhesion or to resist bioadhesion. These variations include geometrical variations, dimensional variations, variations in surface chemistry, or the like. These variations may be static or dynamic variations.

As noted above, the pattern can be disposed on the surfaces of bone implants, such as, for example, an orthopedic implant or other implant in a hip joint replacement or repair, knee replacement or repair, shoulder replacement or repair, elbow replacement or repair, and an ankle replacement or repair. The pattern can also be used as a surface in implantable medical devices where the goal is to cause cells (e.g., progenitor and/or stem cells) to differentiate themselves; the topography of the patterned surface causing this differentiation to occur. As noted above, these medical devices may be implanted permanently or temporarily.

The pattern can be used on outer and inner surfaces of devices, instruments, furniture, and the like used in hospitals, healthcare centers, dental offices, dispensaries, gymnasiums, rehabilitation facilities, bathrooms, waiting rooms, and the like. As listed below, the pattern can be used in hospitals, healthcare centers, dental offices, dispensaries, gymnasiums, rehabilitation facilities, bathrooms, waiting rooms, and the like. The patterns can be used on the surfaces of an electrostatic film applied to operating room surfaces between surgeries; on the surfaces of surgical drapes used to cover patients and/or shield doctors from fluids; on the surfaces of waiting room chairs and waiting room furniture; on the surfaces of operating room instruments; on the surfaces of operating room instrument trays; on high toughness surfaces in hospital rooms; on bedside table surfaces; on bedrail switch panel (e.g., control panels) surfaces; on cover surfaces (polymer covers of various thicknesses and dimensions) such as bed sheets and on other surfaces where keeping the surface clean is important. The surfaces of the aforementioned devices, instruments and furniture may be textured, or alternatively a film having a textured surface can be attached to the device, instrument and furniture using permanent or temporary means of attachment such as adhesives, static electricity, mechanical interlocking devices such as nails, screws, nuts, clips, bevel joints, dove tail joints, and the like.

The pattern can also be used to protect the surfaces of all touch screens such as, for example, a computer screen cover—especially a touch screen cover—where keeping the surface clean is desirable. The film used to protect the touch screen can contact the screen or its frame using the permanent or temporary means of attachment discussed above.

The pattern can also be disposed on the inner and outer surfaces of medical packaging such as the surfaces of a sterile package. It can also be disposed for example, on all bed rail coverings in hospitals, medical facilities and nursing stations. The pattern can also be disposed on all bathroom, locker room and waiting room surfaces, especially on all bathroom and waiting room surfaces in hospitals, office buildings, schools, colleges, stadiums, and other places where mass gatherings of people take place and where there is an increased probability of disease transmission.

For example, in bathroom, locker room and waiting room surfaces, it can be disposed on the surfaces of toilets, sinks, hand washing areas, hand drying areas, mirrors, doors, door handles, door locks, push plates located on door surfaces, supporting rails in the bathrooms, surfaces of sources of illumination (e.g., the overhead lighting in a dentists office), and the like.

The pattern can also be disposed on all surfaces of an ambulance. For example, it can be disposed on all work surfaces that are contacted by the health care provider (e.g., emergency medical technicians, doctors, nurses, laboratory technicians) or by the patient. In another embodiment, the pattern can also be disposed on all surface of Class I medical devices such as, for example, thermometer tips, pens and other stationary, doctor/nurse gowns and clothing used by health care providers.

In one embodiment, the pattern can be disposed on the surfaces of laboratory culture dishes where the attachment of organisms to any surface inside the dish is not desired (e.g., the pattern causes lesser attachment rate than would otherwise be the case). In another embodiment, the pattern can be disposed on a laboratory culture dish where the attachment of an organism to any surface inside the dish is desired (e.g., the pattern causes greater attachment rate than would otherwise be the case).

In one embodiment, the pattern can be disposed on a surface of devices that can be used to carry or to transport medical equipment or medical components (e.g., a contact lens carrying case, packaging for catheters, packaging for guidewires, packaging for needles, packaging for syringes, and the like).

In another embodiment, the pattern can be disposed on surfaces that are contacted by living beings both inside and outside of hospital or health care facilities. The surfaces can be metallic or non-metallic. For example, it can be disposed on the surfaces of bathroom fixtures such as toilet seats, shower tiles, towel racks, shower curtains, and the like. It can also be disposed on the surfaces of kitchens and dining halls (e.g., kitchens in restaurants, homes, hospitals, and the like) and instruments used in kitchens such as, for example, countertops, sinks, refrigerator surfaces, microwave surfaces, oven surfaces, stove top surfaces, food trays (e.g., those used in airlines, ships and on buses), the surfaces of knives, forks, spoons, ventilators, and the like.

The pattern can also be disposed on curved surfaces that transport or store liquids in order to control flow characteristics of liquids that come in contact with the surface. These surfaces can include, for example, shampoo or conditioner bottles, liquid soap bottles, condiment bottles, canned food containers, canned liquid containers, and the like.

The pattern can also be disposed on instruments and/or surfaces used in an office, gymnasium or laboratory environment such as, for example, work table surfaces (e.g., metallic or non-metallic), chair surfaces, handles of chairs, computer surfaces, keyboards, surfaces of a mouse, surfaces of memory sticks, clean room surfaces, exercise equipment surfaces, surfaces of public buses and trains (e.g., grab rails or other surfaces such as push bars on doors that are contacted by living beings), and the like.

The pattern can also be disposed on surfaces used in the transportation of food-stuffs such as plastics, textiles, textile nets, serrated plastics, and the like. The pattern can also be disposed on food packaging, packaging for fruits and vegetables (e.g., carrots, tomatoes, potatoes, corn, apples, grapes, mangoes, cauliflower, oranges, peaches, tangerines, nectarines, lettuce, cabbage, eggplant, okra, onions, nuts, dates, figs, lemons, lime, grapefruit, walnuts, cashew, pecans, and the like).

The pattern can also be disposed on surfaces used in water filtration used in fresh and saline water treatment facilities. For example, it can be used on the inner and outer surfaces of pipes and hoses used to transfer water or other fluids, filters, nozzles, valves, heaters, granular particles, and the like.

It can also be used in devices that are used to transform fluids from a first state to a second state. For example, it can be used on surfaces of devices that are used to transform liquids to gases, gases to solids, solids to liquids and gases to liquids. It can also be used on the surfaces of devices that contact flowing fluids. It can be used on the surfaces of ice makers, vaporizers, humidifiers, air conditioners, fans, propellers, airfoils (e.g., the leading edge and trailing edges of airplane wings), wind tunnels, exterior body panels of automobiles, ships, airplanes, solar panels, wind turbines, turbine blades, siding (e.g., metallic siding such as aluminum, steel, wooden siding and plastic siding) used on the exterior and interior surfaces of buildings, ducts that transport air inside buildings, and the like. The pattern can be used on packaging for thermal insulation used in the interior of structures (e.g., buildings, airplanes, ships, and the like), construction surfaces (e.g., the surface of wooden beams, metal beams, plastic beams, bricks, dry wall, and the like), and the like, to prevent the buildup of spores and mold when such surfaces contact moisture over extended periods of time.

The pattern can also be used on the internal and external surfaces of electronic devices used for entertainment; communications; signal transmission; capturing images; capturing and transmitting auditory signals; and the like. Examples of entertainment devices are solid-state musical devices (e.g., iPODS®), solid-state gaming devices and electronic toys (e.g., NINTENDO DS®, LEAPSTER®), and the like. Examples of communication devices are cell phones (e.g., Motorola i870, iPhone, and the like), personnel digital assistant (PDA) phones (e.g., Blackberry), laptops, iBooks, and the like. Examples of image capturing devices are digital cameras, infrared cameras, infrared scopes, night vision goggles, and the like. Examples of devices for capturing auditory signals are blue tooth headsets, earphones, and the like.

The pattern can also be disposed on surfaces that contact the mucous membranes of living beings. For example, it can be used on all surfaces that are contacted by the human mouth especially those surfaces that contact the mouths of toddlers. Examples of surfaces that are contacted by the mouths of toddlers are high chair trays, pacifiers, diaper changing pads, crib frames and rails, reusable and disposable water bottles, cups and mugs, coffee thermos, toys, blocks, coins, and the like.

The pattern can also be disposed on the surface of a variety of miscellaneous items such as, for example, clothing and accessories, sunglass lenses, frames of sunglasses, eye glass lenses, surfaces and frames of aquariums, outdoor clothing, water resistant jackets, coats, sports clothing, swimsuits, wetsuits, surfboards, outdoor equipment, tents, lanterns, lamps, tickets (e.g., to sporting events, airline tickets, train and ship tickets), shirt and dress collars, textile surfaces that contact armpits and other private parts of the body, high touch surface in hospital rooms; bedside table surfaces; bedrail surfaces, nursing call buttons, bedrail switch panel surfaces; on a surface of control panels or membrane switches; surfaces of medical monitoring equipment or medical equipment used to sustain or support body functions; neonatal support units, incubator units, artificial heart or lung machines, on cover surfaces; or on a bed sheet surface, and the like. Such surfaces can be marketed as antimicrobial surfaces, bacteriostatic or self-cleaning surfaces.

The pattern can also be disposed on the surfaces of camping equipment (e.g., tents, poles, lamps, and the like), camping gear, sports equipment (e.g., parachutes, parachute rigs, parachute bags, insides and outsides of shoes, insoles, and the like), and the like. Such equipment can be marketed as water resistant equipment that deters microorganism aggregation. It can also be marketed as deterring the buildup of odor in shoes and underwear.

The pattern can also be disposed on the surfaces of marine vessels and other devices that contact water. For example, it can be used on boat hulls, intake and outlet pipes for industrial and power plants, drilling rig for underwater surfaces, fish tanks and aquariums, boat surfaces (above the hull), bilge tanks, water treatment plants and pumping station surfaces—any surface inside such a water treatment plant and pumping station where organism growth and colonization is an issue. The pattern can be disposed on the surfaces of bags used to grow algae, for example, it can be used on the surface of a bag used to grow any microorganism but prevent attachment of the microorganism onto the surface of bag (medical or marine—e.g., blood bags where it is desirable to deter organism attachment to bag). Alternatively, by varying the surface texture or the size of the texture dimensions, it can be used on the surface of a bag used to grow any microorganism and encourage attachment of the microorganism to surface of the bag (e.g., a stem cell culture where it is desirable to encourage growth and attachment to surface).

The pattern can also be disposed on a variety of other items: bags, handbags, garbage bags, bags that are used for carrying tissue, fluids from living beings, waste and other byproducts from living beings, and the like. Examples of tissue, fluids, waste from living beings are urine, blood, saline, glucose, feces, fluids from the mucous membranes, and the like.

The pattern can also be used on the surfaces of body parts that are used in surgeries such as, for example, in a colostomy, and the like. It can also be used in replacement joints, plates, tendon and ligament ends for enhanced tissue adaptation, vascular implants, grafts, shunts, access, and the like. The pattern may also be used on the inner and outer surfaces of periodontal dressings; intravenous catheters and ports; foley catheters; surfaces in contact with tissues such as, for example, plates; adhesive tapes, patches, bandages, and the like; electronic leads; dental implants; orthodontia devices; iols (intraocular lenses); hydrogel films for tissue enhancement, skin grafting, isolation of bacteria from tissues; heart-lung machine surfaces to reduce infection, clotting/thrombosis, enhance flow; tissue constructs for organ/tissue genesis; dialysis machine components, tubing and control panels; cochlear/otolaryngology implants and electronic devices; pace maker leads and body; fibrillator leads and body; heart valve flow surfaces and fixation surfaces; spinal implants; cranial/facial implants; biomedical instruments such as, for example, heart valves; scalpels; tongs; forceps;

saws; reamers; grippers; spreaders; pliers; hammers; drills; laryngoscopes; bronchoscopes; oesophagoscopes; stethoscopes, mirrors, oral/ear speculum, xray plates/frames, xray device surfaces, magnetic resonance imaging (MRI) surfaces, echo cardiogram surfaces, cat-scan surfaces, scales, clipboards, and the like.

The pattern can be disposed on hospital surfaces. For example, it can be used as a film to be applied to surfaces that can be readily replaced between surgeries. For example, it can be applied to such surfaces as listed below using electrostatic adhesion, mechanical interlocking or adhesives. The film can be used on table tops, MRI/CAT scan surfaces, X-ray surfaces, scales, operating tables, door push panels, devices or articles that are contacted by human beings such as, for example, light switches, control panels, beds, incubators, monitors, remote controls, call buttons, door push bars, preparation surfaces, instrument trays, pharmacy surfaces, pathology tables, outside surfaces of bed pans, identification surfaces on walls, clothing/protective personal wear, gloves, cling films to attach temporary in public rest rooms/areas, baby changing cling films, films for attaching to bottoms of purses/bags/suitcases, biomedical packaging, such as the outside surface of sterilized packaging; vacuum formed trays/films, cling films for short and long term use, clean room surfaces, such as, for example, those used for the semiconductor or biomedical industry, table tops, push bars, door panels, control panels, instruments, entrance/exit points, food industry, including for packaging, food preparation surfaces, counter tops, cutting boards, trays, entrance/exit points, switches, control panels, scales, packaging equipment operator contact points, marine industry, exterior surfaces of marine vessels including ships, bilge tanks, gray water tanks, water inlet/outlet pipes, power drive systems, propellers, jet ports, water treatment plants including pumping stations, inlet/outlet pipes, control panel surfaces, laboratory surfaces, power plants, inlet/outlet pipes, control surfaces, airline industry, trays on seatbacks, entry/exit push surfaces, bathroom doors, service carts, arm rests, furniture industry, children's cribs, handles on exercise equipment, exercise equipment contact surfaces, changing tables, high chairs, table tops, food prep surfaces, transportation industry, ambulances, buses, public transit, swimming pools.

EXAMPLES

Example 1

The following examples were conducted to demonstrate the methods of manufacturing the patterns on the inside of a tube. In this example, the soft mold was manufactured from a polydimethylsiloxane elastomer. The polydimethylsiloxane elastomer was manufactured from SILASTIC® T-2 silicone resin and a curing agent obtained from Dow Corning. The polydimethylsiloxane resin along with the curing agent in a weight ratio of 10:1 were placed and mixed in a 1000 milliliter beaker. The polydimethylsiloxane and the curing agent were mixed thoroughly with a spatula. The polydimethylsiloxane with the curing agent mixed in it were then placed in a vacuum chamber and allowed to de-gas for 15 minutes.

Figure 7:
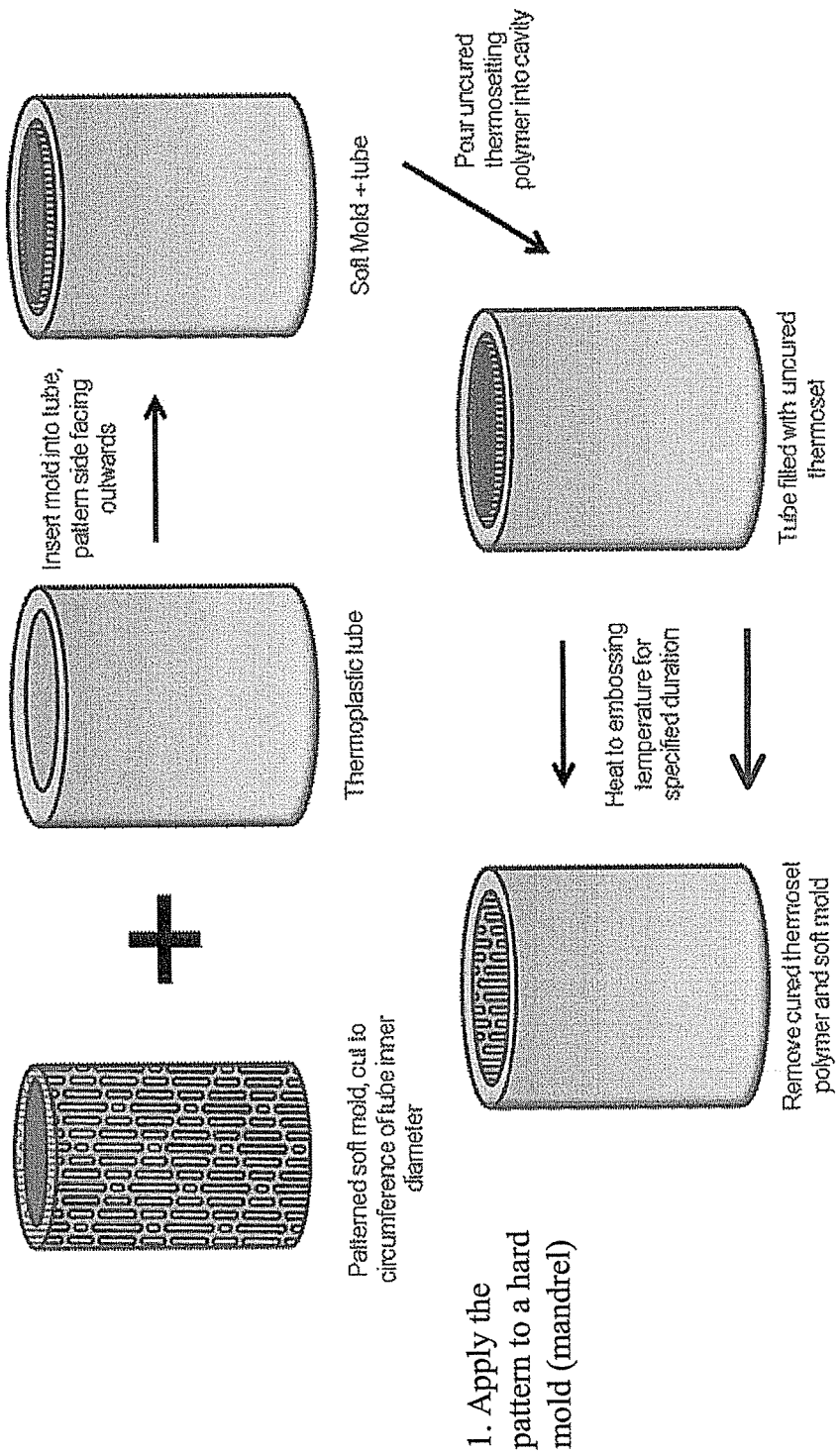
FIG. 7 depicts another method where the pattern is disposed on the inside of a tube.

FIGS. 6 and 7 depict the method of manufacturing the pattern on the inside of a tube. The polydimethylsiloxane (referred to as PDMS in the Figures) and the curing agent were cast onto a patterned silicon wafer mold. The polydimethylsiloxane was depressed into the mold with a force effective to produce an image of the pattern on the cured polydimethylsiloxane. The curing was conducted at room temperature for a period of 24 hours during which pressure was continuously applied. The polydimethylsiloxane film was then removed from the wafer surface. The raised border around each film was then cut away in order to take thickness measurements using calipers. Each film was then cleaned with acetone and ethanol followed by drying with nitrogen gas. The patterned and cured polydimethylsiloxane was then wrapped around a mandrel. As can be seen in the FIG. 6, in one embodiment, an exemplary mandrel can be manufactured from a metal wire. The mandrel is a cylindrical mandrel that forms a frame to support the polydimethylsiloxane film such that the polydimethylsiloxane film can be filled with a curable epoxy. The mandrel has a metal plate on the bottom and permits the patterned and cured polydimethylsiloxane film to be wrapped around it to form a cylindrical pattern.

The cylindrical pattern mounted onto the mandrel is then placed on the inside of a polyvinylchloride tube that is to be patterned. The mandrel supports the polydimethylsiloxane film and permits the outer surface of the film to maintain contact with the inner surface of the polyvinylchloride tube. The polydimethylsiloxane film in the shape of a tube is then filled with a curable epoxy.

The epoxy comprising EPON 815C® and JEFFAMINE D400® (in a 1.50 to 1 weight ratio) are mixed together and disposed in the mandrel inside the patterned polydimethylsiloxane cylinder. The patterned polydimethylsiloxane cylinder with the epoxy disposed therein is then placed in the polyvinylchloride tube and the polyvinylchloride tube is heated to a temperature of about 55° C. for about 16 hours. The epoxy expands during the curing process and depresses the pattern into the polyvinylchloride walls to form a pattern on the inner surface of the polyvinylchloride walls.

Example 2

This example is conducted to demonstrate the formation of an epoxy pattern on the inside of the polyvinylchloride tube. This example is depicted in the FIG. 7. In this example, the polydimethylsiloxane film is disposed on the mandrel as detailed above in the Example 1. The epoxy comprising EPON 815C® and JEFFAMINE D400® (in a 1.50 to 1 weight ratio) are mixed together and disposed in the mandrel inside the patterned polydimethylsiloxane cylinder. A layer of the epoxy is also disposed on the inside of the polyvinylchloride tube. The polydimethylsiloxane cylinder (disposed on the mandrel) is then inserted into the polyvinylchloride tube. The polyvinylchloride tube with the polydimethylsiloxane cylinder contained therein is placed into an oven and heated to a temperature of about 80° C. for about 120 minutes.

After the curing, the polydimethylsiloxane cylinder with the cured epoxy contained therein is removed from the polyvinylchloride tube. The layer of epoxy disposed between the polydimethylsiloxane cylinder and the polyvinylchloride tube undergoes curing to form the pattern and is attached to the surface of the polyvinylchloride tube.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An article comprising:
a curved surface; the curved surface having disposed thereon a plurality of identical patterns; each pattern being defined by a plurality of spaced apart features attached to or projected into the curved surface, at least one spaced apart feature having a dimension of about 1 nanometer to about 10 micrometers, the plurality of features each having at least one neighboring feature having a substantially different geometry, wherein each pattern has at least one feature which is identical to a feature of a neighboring pattern and shares that feature with the neighboring pattern, wherein an average spacing between adjacent spaced apart features is about 1 nanometer to about 1 millimeter in at least a portion of the curved surface, wherein the plurality of spaced apart features are represented by a periodic function; wherein the plurality of identical patterns is disposed on an inner curved surface and an outer curved surface; and wherein the article is used for flow control of liquids that come in contact with the curved surface.

2. The article of claim 1, where the curved surface is a biomedical implant, a breast implant shell, a fluid filled implant shell; a biomedical instrument; a biomedical device; a heart valve; a hospital surface; an endotracheal tube; an airway management device; clothing/protective personal wear; biomedical packaging; sterilized packaging; a clean room surface; a surface of a semiconductor; food packaging; a food preparation surface; an exterior surface of a marine vessel; an interior surface of a marine vessel; an exterior surface of a ship; a bilge tank; an inlet or an outlet to a water pipe; an inner surface of a pipe or hose; a surface in a water treatment plant; a part of a pumping station; a surface of a power plant; a surface of a child's crib, a surface on handles of exercise equipment; a surface on an ambulance, a surface on a bus, a surface on a public transit vehicle; or a surface in a swimming pool.

3. The article of claim 1, where the article is affixed to another surface by an adhesive, by electrostatic forces, by mechanical interlocking devices, or a combination comprising at least one of an adhesive, electrostatic forces or mechanical interlocking devices.

4. The article of claim 1, where the article is used as an outer and/or an inner surface of a device; an outer and/or an inner surface of an instrument; an outer and/or an inner surface of furniture; a surface on and/or in a hospital; a surface on and/or in a healthcare center; a surface on and/or in a dental office; a surface on and/or in a dispensary; a surface on and/or in a gymnasium or locker room/dressing room; a surface on and/or in a rehabilitation facility; a surface on and/or in a bathroom or a surface on and/or in a waiting room.

5. The article of claim 1, where the article is used in hospitals, healthcare centers, dental offices, dispensaries, gymnasiums, rehabilitation facilities, bathrooms, waiting rooms, military centers, barracks, or make-shift facilities.

6. The article of claim 1, where the article is used on a surface of an electrostatic film applied to operating room surfaces between surgeries; on a surface of surgical drapes used to cover patients and/or shield a doctor from fluids; on a surface of waiting room chairs and waiting room furniture; on a surface of operating room instruments; on a surface of operating room instrument trays; on a surface in hospital rooms; on bedside table surfaces; on bedrail surfaces; on nursing call buttons; on bedrail switch panel surfaces; on a surface of control panels or membrane switches; on surfaces of medical monitoring equipment or medical equipment used to sustain or support body functions; on neonatal support units; on incubator units; on artificial heart or lung machines; on cover surfaces; or on a bed sheet surface; on a bathroom, locker room and/or waiting room surfaces; on the surfaces of toilets, sinks, hand washing areas, hand drying areas, mirrors, doors, door handles, door locks, push plates located on door surfaces; on supporting rails in the bathrooms, on surfaces of bathroom fixtures, on surfaces of shower tiles; on surfaces of towel racks; on surfaces of shower curtains or surfaces of sources of illumination; on a work surface on all surfaces that are contacted by a health care provider and/or a patient; on all surfaces of Class I medical devices; on thermometer tips, pens, stationary, doctor and/or nurse gowns, and/or clothing used by health care providers; on devices used for transporting medical equipment or medical components; on devices used to package medical devices, package catheters, package guidewires, package needles and/or package syringes; on surfaces of kitchens and dining halls, surfaces of countertops, surfaces of sinks, refrigerator surfaces, microwave surfaces, oven surfaces, stove top surfaces, surfaces of food trays used in airlines, ships and on buses, surfaces of knives, surfaces of forks and surfaces of spoons; surfaces of ventilators; surfaces of an office; surfaces of a gymnasium; surfaces of a laboratory; work table surfaces; chair surfaces; handles of chairs; computer surfaces; keyboards, surfaces of a mouse; surfaces of memory sticks; clean room surfaces; exercise equipment surfaces; surfaces of public buses and trains; grab rail surfaces; push bar surfaces or hand rail surfaces; surface of a device used for the transportation of food; a filter, nozzle, valve, heater, aspirator, decanter, jar, cup, vaporizer, humidifier, air conditioner, fan, propeller, wind tunnel, exterior body panel of automobile, ship, airplane, solar panel, wind turbine, turbine blade, sidings for buildings, airfoil or siphon; as packaging for thermal insulation used in the interior of structures, buildings, airplanes and ships; a construction surface, where the construction surface is a surface of a wooden beam, a metal beam, a plastic beam, a brick, or dry wall; a surface that contacts water or moisture over extended periods of time; on internal and external surfaces of electronic devices used for entertainment; communications; signal transmission; capturing images; or for capturing and transmitting auditory signals; on internal and external surfaces of electronic devices; the electronic devices being solid-state musical devices; solid-state gaming devices and electronic toys; on cell phones, personnel digital assistant phones, laptops, digital cameras, infrared cameras, infrared scopes, night vision goggles, blue tooth headsets or earphones; on surfaces that are contacted by the mouths of babies or toddlers, the surfaces being high chair trays, pacifiers, diaper changing pads, crib frames and rails, reusable and disposable water bottles, cups and mugs, coffee thermos flasks, toys, blocks, coins or nipples; on clothing and accessories, sunglass lenses, frames of sunglasses, eye glass lenses, surfaces and frames of aquariums, outdoor clothing, water resistant jackets, coats, sports clothing, swimsuits, wetsuits, surfboards, outdoor equipment, tents, lanterns, lamps, tickets, shirt and dress collars or textile surfaces that contact armpits and other private parts of the body; on camping equipment, tents, poles, lamps, camping gear, sports equipment, parachutes, parachute rigs, parachute bags, insides and outsides of shoes or insoles; on the surfaces of marine vessels and other devices that contact water; the surface of marine vessels comprise boat hulls, intake and outlet pipes for industrial and power plants, drilling rigs for underwater surfaces, fish tanks and aquariums, boat surfaces above the hull, bilge tanks, water treatment plants or pumping station surfaces; a bag that is used to grow algae; a bag that is used to deter the growth of algae; a bag; a handbag; a garbage bag; and a bag that is used for carrying tissue, fluids from living beings, waste and other byproducts from living beings.

7. The article of claim 1, where the curved surface is a surface of an electrostatic film applied to operating room surfaces between surgeries; a surgical drape used to cover patients and/or shield a doctor from fluids; a surface of waiting room chairs and waiting room furniture; a surfaces of operating room instruments; a surface of operating room instrument trays; a bedside table surface; a bedrail switch panel surface; a surface of control panels; a cover surface; or a bed sheet surface; a surface in a hospital, a bathroom, an office building, a school, a college, a stadium, a place where mass gatherings of people take place; an inner and/or an outer surface of medical packaging, medical facilities and/or nursing stations; bathroom, locker room and/or waiting room surfaces; a surface of a toilet, sink, hand washing area, hand drying area, mirror, door, door handle, door lock, push plate located on door surfaces, supporting rails in a bathroom or a surface of a source of illumination; a surface of laboratory culture dishes where attachment of organisms to a surface inside the dish is not desired; an inner or outer surface of a device that is used to transfer fluids, water, saline water or granular particles; a surface of a filter, nozzle, valve, heater, aspirator, decanter, jar, cup, vaporizer, humidifier, air conditioner, fan, propeller, wind tunnel, exterior body panel of automobile, ship, airplane, solar panel, wind turbine, turbine blade, sidings for buildings, airfoil or siphon.

8. The article of claim 1, where the article is an electronic device.

9. The article of claim 1, where the curved surface comprises a metal, a ceramic, a plastic, a serrated plastic and/or a textile net or mesh.

10. The article of claim 1, where the article is a device that is used to permit a fluid to undergo a transformation from a first physical state to a second physical state.

11. The article of claim 1, where the article is a device that is used to permit a solid to transform to a liquid and vice versa; a liquid to a gas and vice versa; or a gas to a solid and vice versa.

12. The article of claim 1, where the article is used in replacement joints; plates; tendon and ligament ends for enhanced tissue adaptation; vascular implants; grafts; shunts; inner and outer surfaces of periodontal dressings; intravenous catheters; ports for intravenous catheters; foley catheters; plates; adhesive tapes; patches; bandages; electrical leads; dental implants; orthodontia devices; iols (intraocular lenses); hydrogel films for tissue enhancement; skin grafting; isolation of bacteria from tissues; heart-lung machine surfaces to reduce infection; clotting/thrombosis; tissue constructs for organ/tissue genesis; dialysis machine components; tubing and control panels; cochlear/otolaryngology implants and electronic devices; pace maker leads and body; fibrillator leads and body; heart valve flow surfaces and fixation surfaces; spinal implants; cranial/facial implants; biomedical instruments; heart valves; scalpels; tongs; forceps; saws; reamers; grippers; spreaders; pliers; hammers; drills; laryngoscopes; bronchoscopes; oesophagoscopes; stethoscopes; mirrors; oral/ear speculum; xray plates/frames; xray device surfaces; magnetic resonance imaging surfaces; echo cardiogram surfaces; cat-scan surfaces; scales; and clipboards.

13. An article comprising:
a curved surface; wherein the curved surface comprises an inner curved surface and an outer curved surface
the inner curved surface and the outer curved surface having disposed thereon a plurality of identical patterns; each pattern being defined by a plurality of spaced apart features attached to or projected into a base article, the plurality of features each having at least two neighboring features having a substantially different geometry, at least one spaced apart feature having a dimension of about 1 nanometer to about 10 micrometers, wherein an average spacing between neighboring features is between about 1 nanometer and about 1 millimeter in at least a portion of the surface, wherein the plurality of spaced apart features are represented by a periodic function, wherein each pattern has at least one feature which is identical to a feature of a neighboring pattern and shares that feature with the neighboring pattern.

14. An article comprising:
an inner curved surface;
an outer curved surface;
the inner curved surface and the outer curved surface each having disposed thereon a plurality of identical patterns; each pattern being defined by a plurality of spaced apart features attached to or projected into a base article, the plurality of features each having at least one microscale dimension of about 1 nanometer to about 10 micrometers and having at least one neighboring feature having a substantially different geometry, wherein an average first feature spacing between adjacent ones of the features is between about 1 nanometer and about 1 millimeter in at least a portion of the surface, wherein the plurality of spaced apart features are represented by a periodic function, wherein each pattern has at least one feature which is identical to a feature of a neighboring pattern and shares that feature with the neighboring pattern.

15. The article of claim 1, wherein the average spacing between the adjacent spaced apart features is about one nanometer to about 1,000 micrometers.

16. The article of claim 1, wherein the average spacing between the adjacent spaced apart features is about one nanometer to about 500 micrometers.

17. The article of claim 1, wherein the average spacing between the adjacent spaced apart features is about one nanometer to about 100 micrometers.

18. The article of claim 1, wherein the average spacing between the adjacent spaced apart features is about one nanometer to about 50 micrometers.

19. The article of claim 1, wherein the average spacing between the adjacent spaced apart features is about one nanometer about 25 micrometers.

20. The article of claim 13, wherein the average spacing between the adjacent spaced apart features is about one nanometer to about 1,000 micrometers.

21. The article of claim 13, wherein the average spacing between the adjacent spaced apart features is about one nanometer to about 500 micrometers.

22. The article of claim 13, wherein the average spacing between the adjacent spaced apart features is about one nanometer to about 100 micrometers.

23. The article of claim 13, wherein the average spacing between the adjacent spaced apart features is about one nanometer to about 50 micrometers.

24. The article of claim 13, wherein the average spacing between the adjacent spaced apart features is about one nanometer to about 25 micrometers.

25. The article of claim 14, wherein the average spacing between the adjacent spaced apart features is about one nanometer to about 1,000 micrometers.

26. The article of claim 14, wherein the average spacing between the adjacent spaced apart features is about one nanometer to about 500 micrometers.

27. The article of claim 14, wherein the average spacing between the adjacent spaced apart features is about one nanometer to about 100 micrometers.

28. The article of claim 14, wherein the average spacing between the adjacent spaced apart features is about one nanometer to about 50 micrometers.

29. The article of claim 14, wherein the average spacing between the adjacent spaced apart features is about one nanometer to about 25 micrometers.

* * * * *